US012783314B2

(12) United States Patent
Agrawal et al.

(10) Patent No.: US 12,783,314 B2
(45) Date of Patent: Nov. 3, 2026

(54) METHOD, SYSTEM, AND COMPUTER READABLE MEDIA FOR EFFICIENT CLOUD RESOURCE MANAGEMENT

(71) Applicant: INFORMATICA LLC, Redwood City, CA (US)

(72) Inventors: Atam Prakash Agrawal, Fremont, CA (US); Yongqin Xiao, Fremont, CA (US)

(73) Assignee: INFORMATICA LLC, Redwood City, CA (US)

( * ) Notice: Subject to any disclaimer, the term of this patent is extended or adjusted under 35 U.S.C. 154(b) by 397 days.

(21) Appl. No.: 18/534,051

(22) Filed: Dec. 8, 2023

(65) Prior Publication Data

US 2025/0173189 A1 May 29, 2025

Related U.S. Application Data

(60) Provisional application No. 63/603,839, filed on Nov. 29, 2023.

(51) Int. Cl.
*G06F 12/00* (2006.01)
*G06F 9/50* (2006.01)

(52) U.S. Cl.
CPC .......... *G06F 9/5038* (2013.01); *G06F 9/5072* (2013.01)

(58) Field of Classification Search
CPC .... G06F 9/5038; G06F 9/5072; G06F 9/4843; G06F 9/4887; G06F 2209/5017; G06F 9/4881; G06F 9/5027; G06F 9/5066; G06F 9/5077; G06F 2209/5019; G06F 9/505
See application file for complete search history.

(56) References Cited

U.S. PATENT DOCUMENTS

2010/0275213 A1* 10/2010 Sakai .................... G06F 9/5033 718/104
2020/0117507 A1* 4/2020 Payton .................... G06F 9/505

* cited by examiner

*Primary Examiner* — Shawn X Gu
(74) *Attorney, Agent, or Firm* — Reed Smith LLP; Amardeep S. Grewal; Paul J. McDonnell

(57) ABSTRACT

A method, apparatus, and non-transitory computer-readable medium for scheduling a job on a cluster, including receiving a job comprising one or more stages, each stage comprising one or more tasks, requesting historical data based on metadata associated with each of the one or more stages of the job and environmental configuration data of the cluster, determining a resource requirement of each stage of a plurality of stage groups wherein a stage group comprises one or more stages, scheduling the first stage group on the cluster, requesting a one or more new worker containers on the cluster for execution of a first subsequent stage group to be executed after the first stage group, and scheduling the first subsequent stage group on the cluster based at least in part on the completion of execution of the first stage group.

20 Claims, 11 Drawing Sheets

METHOD, SYSTEM, AND COMPUTER READABLE MEDIA FOR EFFICIENT CLOUD RESOURCE MANAGEMENT

CROSS-REFERENCE TO RELATED APPLICATION

This application claims priority to U.S. Provisional Patent Application No. 63/603,839 filed on Nov. 29, 2023 under 35 U.S.C. § 120, the disclosure of which is incorporated by reference herein.

FIELD

This disclosure relates generally to the field of data integration and specifically to data integration in a cloud computing environment.

BACKGROUND

In a data integration product, ETL jobs are known and commonly used. An ETL job refers to a three step process of data processing, which can be described as a data pipeline involving the following steps: (1) extract, (2) transform, and (3) load. At the data extraction step, data is extracted from one or more sources that can be from the same source system or different source systems (i.e., the data can be homogenous or heterogeneous). At the transform step, the extracted data is cleaned, transformed, and integrated into the desired state. The transform step can include a single data transformation or multiple data transformations. Finally, at the load step, the resulting data is loaded into one or more targets, such as a database or other storage system/device, on the same target system or different target systems. Each data pipeline can be identified by its own unique ID. Data pipelines can have the same data pipeline ID, however, where they share the same ETL steps.

An ETL job can be divided into one or more stages representing a smaller set of transformation units of the job. The transformation units of a given stage can generally be run together one after the other in a pipeline or in parallel, allowing for simultaneous execution of stages. A transformation unit is a single unit of work/computation configured to execute a series of instructions.

The data source (including source and target systems as discussed above) can be of different types, such as files, databases, or other applications, as well as of different complexities, such as a flat file, a Json, Avro, or parquet. This data can be located on a locally shared file system, such as an NFS, or on a remote distributed file system, such as an S3.

SUMMARY

In some aspects, the present disclosure related to a method for scheduling a job on a cluster executed by one or more computing devices of an executor for job execution on a cluster comprising a plurality of nodes, the method comprising: receiving, by the executor, a job, the job comprising a plurality of stages, each stage comprising one or more tasks, wherein each task is configured to perform a transformation on data input to the task; requesting, by the executor, historical data from a database based at least in part on metadata associated with each one or more stages of the plurality of stages of the job and environmental configuration data of the cluster; determining, by the executor, a resource requirement of each stage group and an execution time of each stage group in a plurality of stage groups based at least in part on a desired execution time of the job, the historical data, the environmental configuration data of the cluster, and an input data size of each stage group, wherein each stage group comprises one or more stages in the plurality of stages, wherein stages in a stage group comprising a plurality of stages are configured to be executed in parallel; scheduling, by the executor, a first stage group in the plurality of stage groups on the cluster for execution, wherein each task in the first stage group is executed by a worker container of a node in the plurality of nodes of the cluster; requesting, by the executor, one or more new worker containers on the cluster for execution of a second stage group configured to be executed after the first stage group, wherein requesting the first set of one or more new worker containers causes the cluster to create a first set of one or more warmup containers, wherein each warmup container has a lower priority than a worker container; and scheduling, by the executor, at least a portion of the second stage group on the one or more warmup containers based at least in part on completion of execution of the first stage group, wherein scheduling the second stage group on the one or more warmup containers converts the one or more warmup containers to one or more worker containers.

In some aspects, the historical data comprises: a plurality of job feature vectors comprising job-level runtime characteristics of jobs previously executed on the cluster; one or more stage feature vectors comprising stage-level runtime characteristics of stages previously executed by the cluster; and one or more task feature vectors comprising runtime characteristics of tasks previously executed by the cluster.

In some aspects, the job-level runtime characteristics comprise a maximum execution time, a minimum execution time, and an average execution time of previous executions of jobs by the cluster, the stage-level runtime characteristics comprise a minimum data skewness, a maximum data skewness, an average data skewness, a ratio of a total data size of a particular stage and a number of tasks in the particular stage, and an average execution time of the particular stage corresponding to previous executions of stages by the cluster, and the task-level runtime characteristics comprise a maximum execution time, a minimum execution time, an average execution time of a particular task, and an average task scheduling delay corresponding to previous executions of tasks by the cluster.

The method can further include the steps of receiving, by the executor, runtime statistics for the job after the job is executed by the cluster, the runtime statistics comprising job-level, stage-level, and task-level metadata about execution of the job by the cluster; and determining, by the executor, whether a matching feature vector corresponding to the job exists in the database; and if a given one of a stage feature vector, a task feature vector, and a job feature vector corresponding to the job, its stages, and its tasks exists in the database, the method further comprises updating, by the executor, the corresponding feature vectors with the runtime statistics, and if a one of a stage feature vector, a task feature vector, and a job feature vector corresponding to the job, its stages, and its tasks does not exist in the database, the method further comprises generating, by the executor, new feature vectors corresponding to the job, its stages, and its tasks with the runtime statistics.

The step of determining a resource requirement of the job and an execution time of the job can include determining, by the executor, whether a matching job feature vector is stored in the database, and if a matching job feature vector is stored in the database, identifying, by the executor, the resource requirement of the job defined in the matching job feature vector, and if no matching job feature vector is stored in the database, determining, by the executor, a simulated resource requirement.

The step of determining a simulated resource requirement can include: identifying, by the executor, one or more stage groups of the job, wherein each stage group comprises one or more stages; retrieving, by the executor, a stage feature vector and a task feature vector corresponding to each stage of each stage group, wherein each stage feature vector and each task feature vector is associated with a corresponding job feature vector stored in the database; and calculating, by the executor and based at least in part on the retrieved stage feature vectors and task feature vectors, a simulated resource requirement for each stage group.

The method can further include the steps of requesting, by the executor, one or more second new worker containers on the cluster for execution of a third stage group to be executed after the second stage group, wherein requesting the one or more new worker containers causes the cluster to create a one or more second warmup containers; and scheduling, by the executor and based at least in part on completion of execution of the second stage group, the third stage group on the one or more second warmup containers, wherein scheduling the third stage group on the one or more second warmup containers converts the one or more second warmup containers to one or more worker containers.

In some aspects, the simulated resource requirement for each stage group of the job is determined based on at least in part a desired execution time of a respective stage group, an input partition count for the respective stage group, an average execution time for the respective stage group determined from the similar feature vector from the database, and an average task scheduling delay.

In some aspects, the present disclosure relates to an apparatus for scheduling a job on a cluster. The apparatus includes one or more processors and one or more memories operatively coupled to at least one of the one or more processors and having instructions stored thereon that, when executed by at least one of the one or more processors, cause at least one of the one or more processors to perform any of the methods described above.

In some aspects, the present disclosure relates to at least one non-transitory computer-readable medium storing computer-readable instructions that, when executed by at least one of one or more computing devices, cause at least one of the one or more computing devices to perform any of the methods described above.

DETAILED DESCRIPTION

Figure 1:
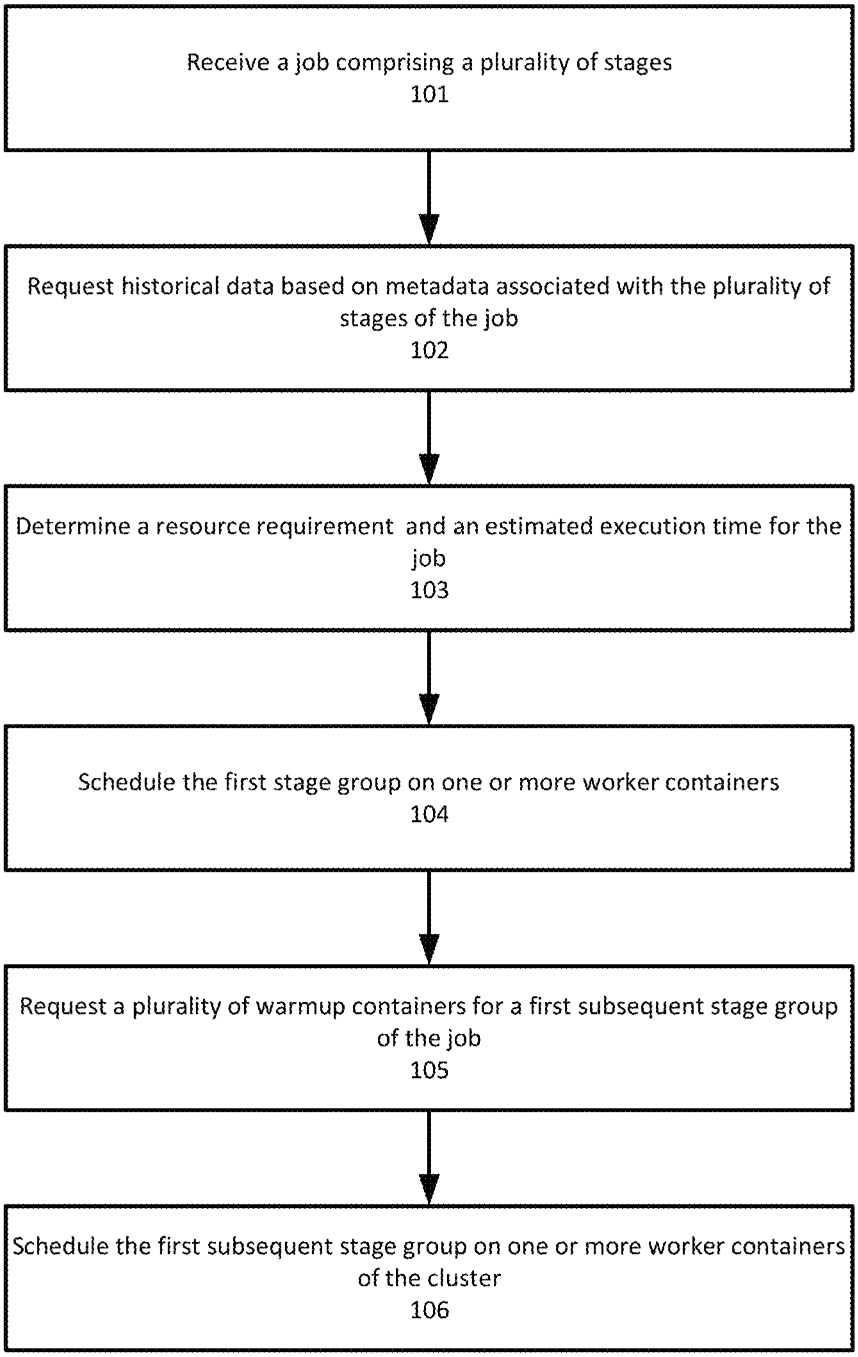
FIG. 1 illustrates a flowchart for scheduling a job on a cluster according to an exemplary embodiment.

In cloud computing, elasticity of cloud resources can be a key factor in scheduling and executing computational tasks. Known solutions utilize auto-scaling techniques that can scale cloud resources up or down as computational workload changes, but such solutions can be costly when resources are not fully and efficiently utilized.

This is because scaling worker nodes and worker containers has an overhead cost to job execution time resulting from the time it takes to prepare a node from execution of a particular job (e.g., bringing a node online, installing required binaries and/or software to execute a particular job, etc.). Further, in some instances, a time delay between a request for a worker container and the creation of the that worker container can cause the new worker container to be ready to execute a particular task after the particular task has already been executed by a different worker container. This results in low utilization of newly scaled worker containers, resulting in even more waste of resources and increased costs.

Moreover, when dealing with a cluster of limited capacity processing multiple jobs in parallel, a lower priority yet larger job that is started earlier could take away a majority of the cluster's resources if the job's resource allocation is not constrained. This could result in delays for the subsequent higher priority jobs. These delays and resource waste effect the ability for the cluster to execute a job within a desired job execution time.

As such, there exists a need for a technique for proactively scaling cloud resources that balances the resource requirements of a job with a desired job execution time to efficiently spend cloud resource.

Applicant has discovered a method, apparatus, and computer-readable medium that aims to execute computing jobs on a cluster to overcome the drawbacks of known techniques by pre-emptively scaling cloud resources before execution of a particular transformation of a data pipeline is performed. Applicant's technique analyzes job-level, stage-level, and task-level resource requirements of a particular data pipeline to schedule stages of an application for execution on worker containers of a cloud-based computing cluster. The technique analyzes the resource requirements of the stages and stage groups and a desired job execution time of a data pipeline to pre-scale worker containers on nodes of the cluster by proactively create and/or reserve worker containers before a stage is to be executed. A pre-scaled worker container that has been created and/reserved proactively may be referred to as a "warmup container." This ensures that a worker container is prepared to execute a stage when it is time, reducing the execution time delay caused by scaling worker nodes after a prior stage is executed and reducing waste of unused computing resources when task execution is completed before a worker container can be scaled up. These warmup containers are given a lower priority than worker containers that are assigned to execute tasks of a job now. This means that a warmup container can be interrupted and/or re-allocated from the future stage group it has been assigned to execute in favor of a different stage group that is being executed now. In contrast, a worker container assigned to execute a stage group now cannot be interrupted and/or re-allocated to a different stage group.

For example, a first job may be submitted to the cluster for execution. The cluster may begin executing a first stage group of the first job of one or more worker containers of the cluster. The cluster can also proactively prepare one or more warmup containers on the cluster to execute the next stage group in the first job. While the cluster executes the first stage group of the first job, a second job is submitted to the cluster for execution. However, the cluster may not have enough available recourses to execute the first stage group of the second job, in part because of the resources being allocated to the warmup containers reserved for the next stage group of the first job. In this situation, because the warmup containers, which are not presently executing tasks of a stage group, have a lower priority than the worker containers, which are presently executing tasks of a stage group, the cluster can re-allocate the warmup containers to the first stage group of the second job as worker containers to begin executing the tasks of the first stage group of the second job. In contrast, the cluster may not re-allocated worker containers from the first stage group of the first job to the first stage group of the second job because the worker containers have a higher priority than the warmup containers. Re-allocating a warmup container can include interrupting a process on a warmup container and transitioning the warmup containers to a worker container capable of executing the tasks of the first stage group of the second job. Interrupting a process on a warmup container can include, but is not limited to, terminating a software download that was preparing the warmup container to execute the tasks of the next stage group of the first job. Transitioning the warmup containers to a worker container can occur when the warmup container is assigned to execute the first stage group of the second job and a task is scheduled thereon.

Each data pipeline, i.e., each ETL job consisting of a (1) extract, (2) transform, and (3) load, can be described with a data pipeline ID and can be executed in one or more physical execution units called stages. These stages can form a DAG (direct acyclic graph), which indicates the execution order of the stages and whether stages need to run in sequence or whether some can run in parallel. These stages can be further grouped together based on their execution order into stage groups, where stages in each stage group can be executed in parallel.

Within each stage, the input data can be split into smaller data partitions that are typically of equal size. Data partitions within a stage can be executed in parallel. The number of partitions in a stage is equal to the input data size of the stage divided by the partition size. However, where data partitions are not of equal size, the execution time of each partition may not be equal, as execution of a partition of 10 Mb will take longer than execution of a partition of 1 Mb, assuming an identical execution environment (e.g., identical hardware, network bandwidth, operating system, etc.).

In addition, a change in data distribution across partitions creates a data skewness, which must be taken into account when estimating a number of worker containers needed to execute a stage or job in a desired amount of time and vice-verse. Thus, a data skewness factor can be used to refer to an uneven distribution of data among partitions within stages of a job.

Further, each stage can consist of a set of tasks, and each task applies the transformation operations of the stage on one data partition. Each task is executed by one of the worker containers of the cluster. A worker container refers to a process that runs on a worker node in the cluster. A worker node can host one or more worker containers such that a worker node can execute more than one task in parallel. Each worker container can be allocated a configurable amount of resources from the worker node, such as processing core and memory, to execute a particular task. For the purpose of illustration, assuming only one stage is scheduled for execution, this means that the number of concurrent tasks of a stage executing at any given time depends on the number of worker containers assigned to the stage and the number of partitions to be processed in the stage.

While methods, apparatuses, and computer-readable media are described herein by way of examples and embodiments, those skilled in the art recognize that methods, apparatuses, and computer-readable media for scheduling jobs on a cluster are not limited to the embodiments or drawings described. It should be understood that the drawings and description are not intended to be limited to the particular form disclosed. Rather, the intention is to cover all modifications, equivalents and alternatives falling within the spirit and scope of the appended claims. Any headings used herein are for organizational purposes only and are not meant to limit the scope of the description or the claims. As used herein, the word “can” is used in a permissive sense (i.e., meaning having the potential to) rather than the mandatory sense (i.e., meaning must). Similarly, the words “include,” “including,” and “includes” mean including, but not limited to.

FIG. 1 illustrates a flowchart of a method 100 for scheduling a job on a cluster according to an exemplary embodiment. At step 101, one or more computing devices of an executor of a cluster can receive a job, such as an ETL job, for execution. In some embodiments, the job includes a plurality of stages, each stage including one or more tasks to be executed by a worker container of the cluster.

Figure 2A:
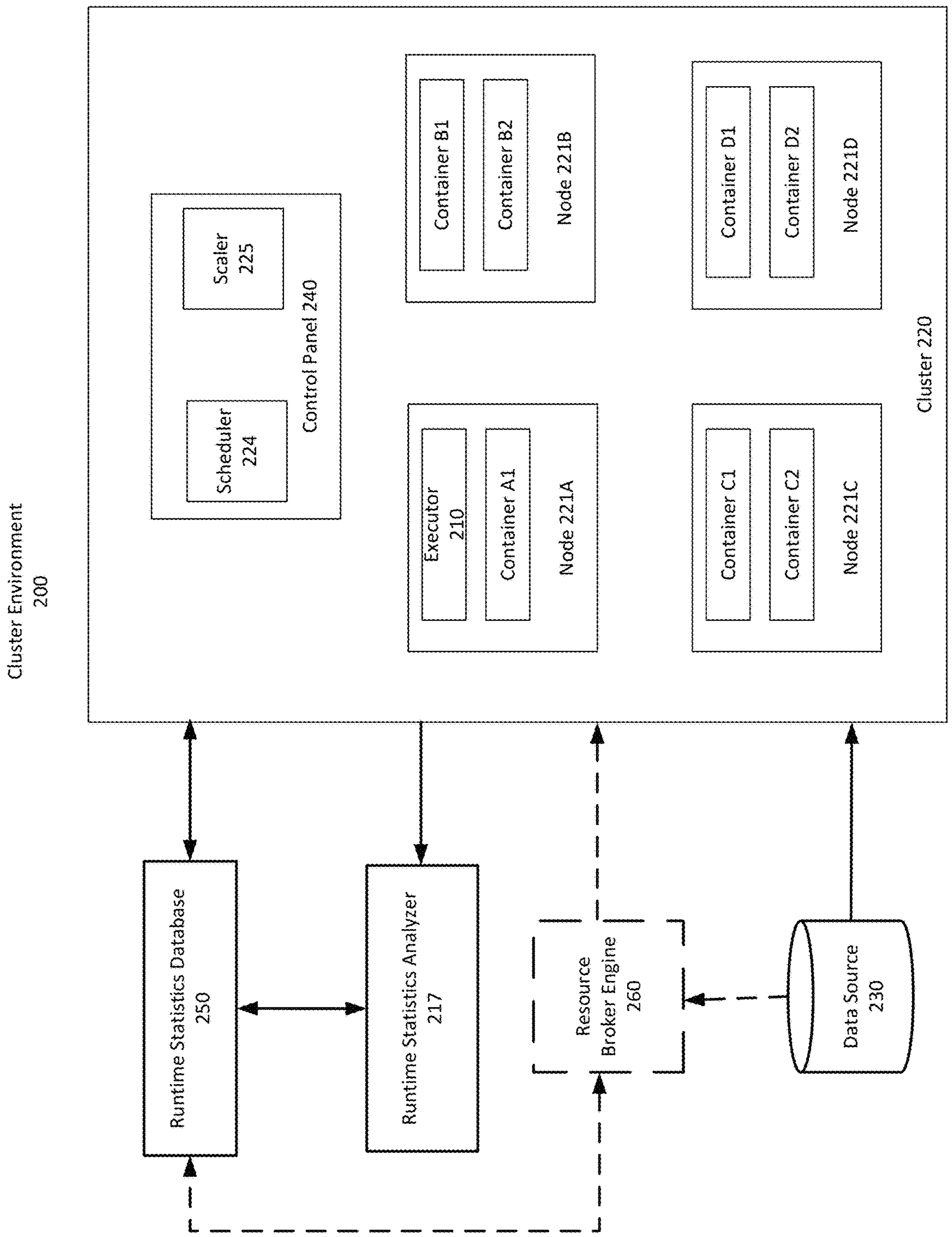
FIG. 2A illustrates an exemplary embodiment of a cluster environment.

FIG. 2A illustrates an exemplary embodiment of a cluster environment 200 according to the present disclosure. Cluster environment 200 can include a cluster 220, a data source 230, a runtime statistics analyzer 217, and a runtime statistics database 250. In some embodiments, cluster environment 200 includes a resource broker engine 260.

Cluster 220 can include a plurality of worker nodes, e.g., nodes 221A, 221B, 221C, and 221D, and a control panel 240. Each worker node includes one or more worker containers, e.g., container A1, B1, B2, C1, C2, D1, and D2, that execute tasks of a stage group of the received job. Cluster 220 further includes an executor 210, which is a master container located on one of the worker nodes of cluster 220, illustrated here as a container of worker node 221A, that schedules the tasks of the job for execution on worker containers of cluster 220.

Figure 2B:
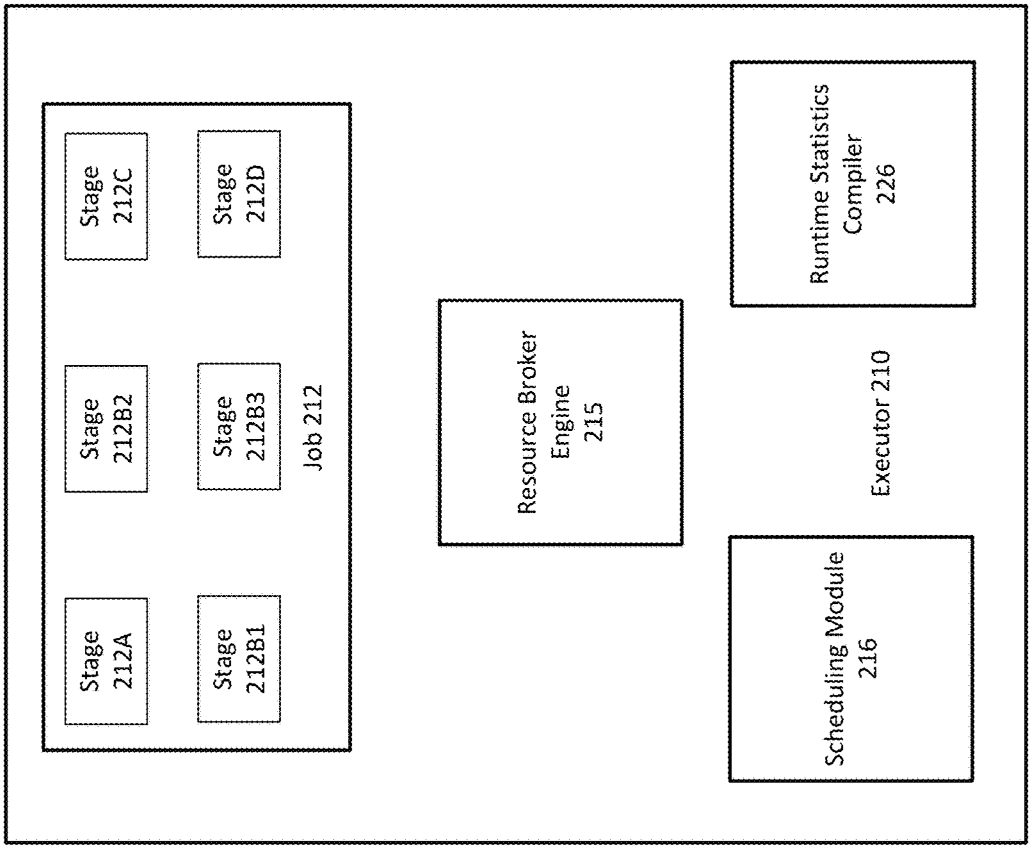
FIG. 2B illustrated an exemplary embodiments of an executor.

FIG. 2B illustrates an exemplary embodiment of an executor 210 according to the present disclosure. Executor 210 can receive a job 212 having a plurality of stages 212A, 212B1, 212B1, 212B2, 212C, and 212D. Stages 212B1 and 212B2, and 212B3 are numbered as such because they are in the same stage group, and the remaining stages are each in a separate stage group. Job 212 is illustrated as including six stages for illustrative purposes only, and a person of ordinary skill in the art will appreciate that a job can include any number of stages without departing from the scope of this disclosure.

Control panel 240 can be a node of cluster 220 that includes a scheduler 224 for scheduling the worker containers of the worker nodes of cluster 220 and a scaler 225 for scaling worker nodes of cluster 220. While not illustrated, control panel 240, scheduler 224, and scaler 225 are communicatively coupled with each worker node of cluster 220.

Executor 210 can include a resource broker engine 215 for requesting feature vectors from runtime statistics database 250 and comparing job level, stage level, and task level characteristics of a job received by executor 210, e.g., job 212, in order to determine a resource requirement of executing job 212 (as described with respect to step 103 of method 100 in FIG. 1 and method 400 in FIG. 4), a scheduling module 216 for transmitting instructions to control panel 240 that can cause scheduler 224 of control panel 240 to schedule the worker containers to be used to execute the tasks of a stage group of job 212 and can cause scaler 225 of control panel 240 to scale additional worker nodes on cluster 220, and a runtime statistics compiler 226 for compiling runtime statistics about the execution of a job, its stages, and its tasks on the worker containers of cluster 220 to be analyzed by runtime statistics analyzer 217.

As illustrated in FIG. 2A, in some embodiments, cluster 220 can receive a job from data source 230, which may be used by a data pipeline to read data and apply a transformation. This can include control panel 240 receiving job 212 from data source 230 and, upon receiving job 212, creating executor 210 on a master container of worker node 221A. In alternative embodiments in which cluster environment 200 also include resource broker engine 260, job 212 can first be received by resource broker engine 260, and then cluster 220 can receive job 212 from resource broker engine 260. In such alternative embodiments, resource broker engine 260 can transmit instructions to control panel 240 causing scaler 225 to scale one or more worker nodes on cluster 220 for execution of a first stage group of job 212, as discussed in greater detail below with respect to FIG. 7A.

Figure 3:
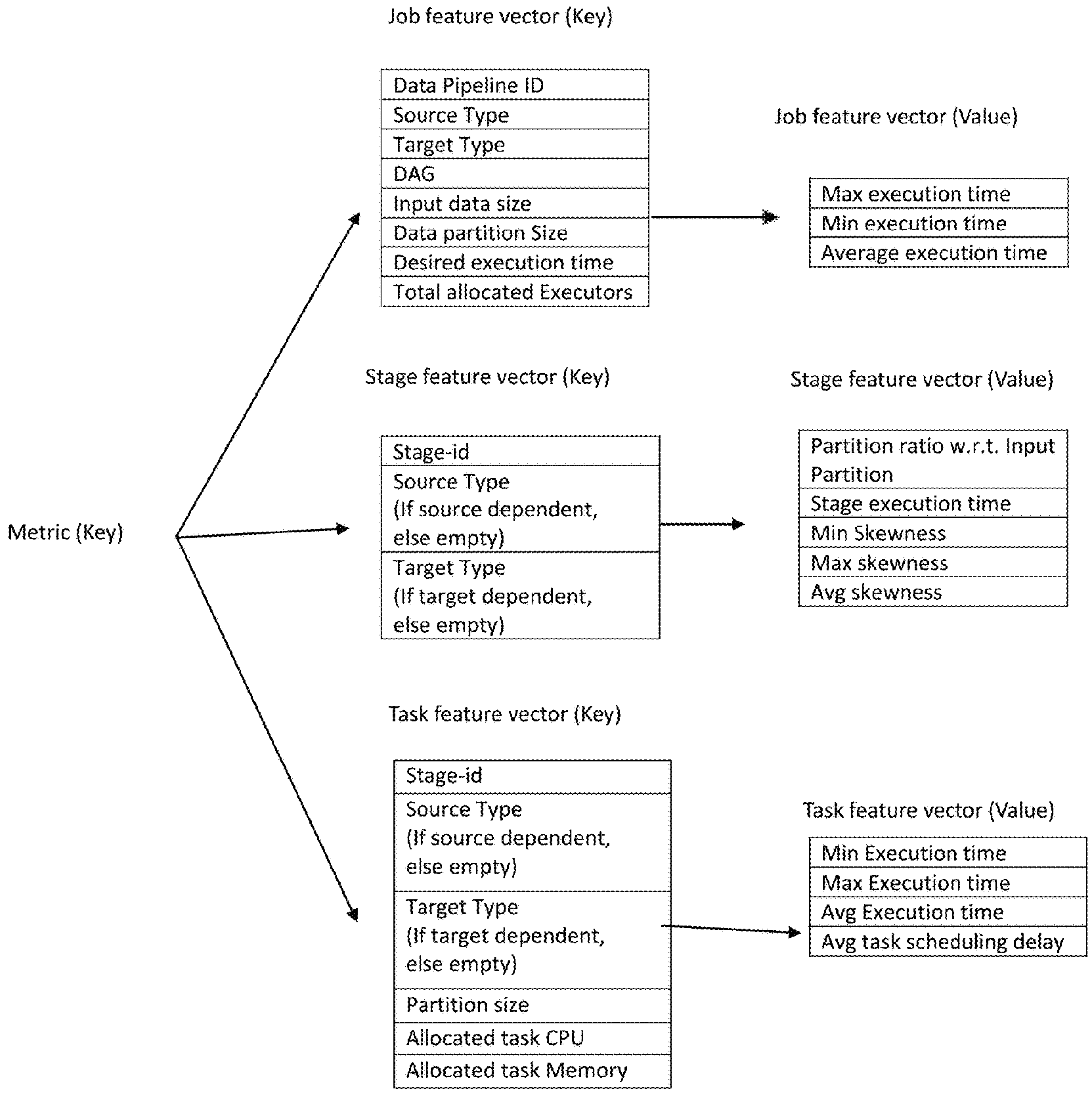
FIG. 3 illustrates an exemplary embodiment of a job feature vector, a stage feature vector, and a task feature vector.

Returning to FIG. 1, at step 102, the executor requests historical data based on metadata associated with the plurality of stages of the received job. In some embodiments, resource broker engine 215 of executor 210 can identify a data pipeline ID of job 212 and submit a request to runtime statistics database 250 for historical runtime data of previous executions of jobs matching the data pipeline ID of job 212. The historical runtime data includes statistics corresponding to jobs previously executed by worker containers of worker nodes of cluster 220, such as average execution time, average partition size, and a number of nodes and/or containers used to execute a job in previous iterations. In some embodiments, the historical runtime statistics can be represented as feature vectors, an example of which is illustrated in FIG. 3.

The request sent to runtime statistics database 250 from resource broker engine 215 of executor 210 can include metadata about the job received by executor 210 in step 101, which can include job level, stage level, and task level information. For example, the request can contain information including, but not limited to, a source type (i.e., a source type of data source 230 from which job 212 is received), a target type (i.e., database type of job 212 after execution/transformation is performed), a job configuration (i.e., a data acyclic graph (DAG) illustrating any dependencies of a job), an input data size, a partition data size (i.e., a desired size of each available data partition), a desired execution time (i.e., as defined in the job 212), and a machine type (i.e., an identification of the desired type of computing nodes to execute a job).

As discussed above, FIG. 3 illustrates an exemplary embodiment of historical runtime data stored in runtime statistics database 250 requested by resource broker engine 215 at step 102. The historical runtime data can include statistics of previously executed jobs and can provide statistics at the job-level, stage-level, and task-level represented as feature vectors. The job feature vectors include characteristics of the job-level execution, which provide insight into the execution behavior that helps inform executor 210's determination of resource requirements and execution time, the scheduling of the job onto cluster 220, and the scaling of warmup containers on cluster 220. The stage feature vectors contain characteristics of the execution of specific stages of a job, which provide insight into the nature of the stage and data skewness of partitions of that stage. These factors both inform the scheduling of stages on cluster 220 and the scaling of warmup containers of cluster 220 by identifying potential stage-related execution issues like data skewness, interdependency, and the like. Lastly, task feature vectors contain characteristics of the execution of individual tasks of specific stages, which, like the stage feature vectors, provide insights into the behavior of task execution.

Each feature vector can include a set of keys and a set of values associated with the set of keys. For example, a job feature vector can include job feature keys that include some or all of the metadata included in the request for historical runtime statistics, including source type, target type, a direct acrylic graph of a particular job, an input data size, a data partition size, a desired execution time of the particular job, and a total computational resource on the cluster allocated to the execution of the job. Based on these job-feature keys, executor 210 can determine a resource requirement and an estimated execution time of a requested job matching the job feature keys (as explained in more detail with respect to step 103 of method 100). The corresponding job feature values of the job feature vector can include statistics about previous executions of jobs matching the job feature keys. These job feature values can include a maximum execution time of the job, a minimum execution time of the job, an average execution time of the job, and a number of containers for execution of the job according to previous instances of executing one or more jobs sharing the job feature keys contained in the request for historical runtime data.

Runtime statistics database 250 can also store stage-level runtime statistics based on stage-level information of previously executed jobs. For example, a stage feature vector can include stage feature keys such as a stage ID (i.e., an identifier of the data pipeline of a corresponding stage of a job), a source type if the transformations of the stage are source type dependent, and a target type if the transformations of the stage are target type dependent. If the stage is not source dependent, then the source type key is empty. A stage can be source dependent if the stage is read from a particular data source type. If the stage is not target dependent, then the target type key is empty. A stage can be target dependent if it writes onto a particular target database type. Based on these stage-feature keys, executor 210 can determine a resource requirement and/or an estimated execution time for particular stages and stage groups comprising a plurality of stages that can be executed in parallel of a received job matching the job feature vector that corresponds to the stage feature vector (as described in detail with respect to step 103 of method 100). The stage feature values of a stage-feature vector can include a partition ratio taken with respect to a number of partitions of a preceding stage, an average execution time of the stages of the particular job, a minimum data skewness of the stages of the particular job, a maximum data skewness of the stages of the particular job, and an average data skewness of the stages of the particular job.

Runtime statistics database 250 can further store task-level runtime statistics based on task-level information of previously executed jobs. For example, a task feature vector can include task feature keys such as a stage ID for the stage to which a particular task corresponds to, a source type if the transformation associated with a particular task is source type dependent, a target type if the transformation associated with a particular task is target type dependent, a size of a partition required to execute a particular task, a CPU allocation for a particular task, and a memory allocation for a particular task. As with the stage feature keys, if the stage is not source dependent, then the source type task feature key is empty, and if the stage is not target dependent, then the target type task feature key is empty. Based on these task feature keys, executor 210 can determine a resource requirement and/or an estimated execution time for particular tasks of a received job that matches the job feature vector that corresponds to the particular task feature vectors. The task feature values of a task feature vector can include a minimum execution time, a maximum execution time, an average execution time, and an average task scheduling delay, which represents the average time it takes to schedule a subsequent task once a prior task has been executed.

Returning to FIG. 1, at step 103, executor 210 determines a resource requirement and/or an estimated execution time for job 212. Determining the resource requirement and/or estimated execution time can include executor 210 parsing the historical data stored in runtime statistics database 250 for a job feature vector that matches the data pipeline ID and machine type of job 212 received by executor 210. If runtime statistics database 250 includes a stored job feature vector with a data pipeline ID and a machine type that matches those of the received job, then resource broker 215 of executor 210 determines whether the input data size of the stored job feature vector is within an acceptable tolerance of the input data size of the requested job. The input data size is proportional to the resource requirement and the execution time of the job, as a larger data input size requires a larger number of computing resources (e.g., a number of nodes on cluster 220 and, more specifically, a number of containers on cluster 220) to execute at a desired execution time or require a greater execution time for a smaller number of computing resources. In some embodiments, the acceptable tolerance of the input data size may be plus or minus ¼ of a data partition size of job 212.

If the input data size is within the acceptable tolerance, then executor 210 determines whether the requested job can be executed in the desired time using the number of worker containers defined in the stored job feature vector. To determine if the desired execution time can be met, resource broker engine 215 compares the desired execution time indicated by the metadata of job 212 with the historical minimum and maximum execution times observed for previous job runs in the stored job feature vector. This helps ensure that job 212 can be executed within the specified time constraints the metadata of job 212. If the desired execution time is within that maximum and minimum execution time, then resource broker engine 215 determines that the resource requirements for job 212 correspond to the number of worker containers identified in the stored job feature vector. If the number of worker containers defined in the stored job feature vector cannot execute job 212 in the desired time indicated by job 212, then resource broker engine 215 determines that stored job feature vector is not a matching job feature vector.

In embodiments in which resource broker engine 215 of executor 210 determines the resource requirements based on a matching feature vector, executor 210 proceeds to step 104 of method 100. In such embodiments, resources broker 215 can also determine the stage groups of the job and the stages that make up each stage group based on the matching feature vector. The matching feature vector may include values defining the stage groups or values identifying dependencies of the stages that indicate whether one or more stages can be executed in parallel and therefore are part of a particular stage group.

Figure 4:
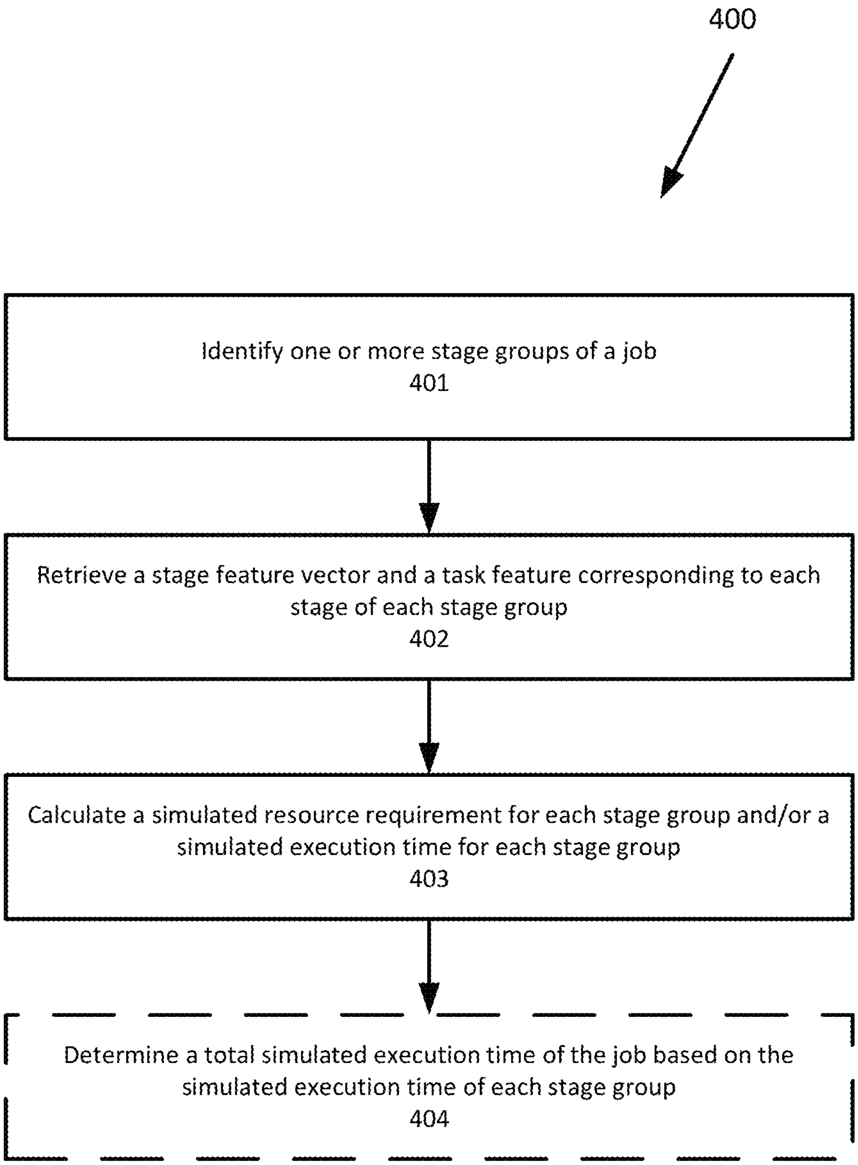
FIG. 4 illustrates a flowchart for calculating a simulated resource requirement and a simulated execution time for a stage of a job according to an exemplary embodiment.

In embodiments in which resource broker engine 215 of executor 210 determines that no matching feature vectors exist in historical runtime database 250, executor 210 proceeds to execute method 400 of FIG. 4 to determine a resource requirement of the requested job according to a simulated resource requirement based on similar but non-matching job feature vectors. A similar but non-matching job feature vector is a job feature vector with a data pipeline ID that matches the data pipeline ID of the job received by executor 210 but that cannot be used to execute the received job. The similar job-feature vector may not be able to execute the received job for a number of reasons, such as the input data size being greater than the acceptable tolerance or the desired execution time for the requested job is not within the maximum and minimum execution times of the similar job-feature vector. A job-feature vector may be similar but non-matching if other metadata about the received job does not match the job feature keys of the job feature vector, such as the source or target type.

With reference to FIG. 4, an exemplary embodiment of a method 400 for determining a simulated resource requirement for a received job based on similar job feature vectors is described.

At step 401, executor 210 identifies one or more stage groups of a job. This can include resource broker engine 215 of executor 210 analyzing a directed acyclic graph (DAG) of job 212 that represents the job's stage level dependencies as a sequence of stages organized into stage groups. A stage group can include one or more stages, and each stage in a stage group is configured to be executed in parallel when the stage group includes a plurality of stages. Stage groups may only executed sequentially and not in parallel with other stage groups. To determine the stage or stages that make up a particular stage group, executor 210 can perform a dependence analysis on the job to identify any dependencies between stages of the job that may necessitate sequential execution. Stages that have dependencies on other stages may not be part of the same stage group because those stages cannot be executed in parallel. In other words, if a stage requires as input the output of another stage, then those stages are not in the same stage group because one must be executed before the other. Exemplary dependence analyses include, but are not limited to, a control dependency analysis, a flow dependence analysis, and an output dependence analysis.

Figure 5:
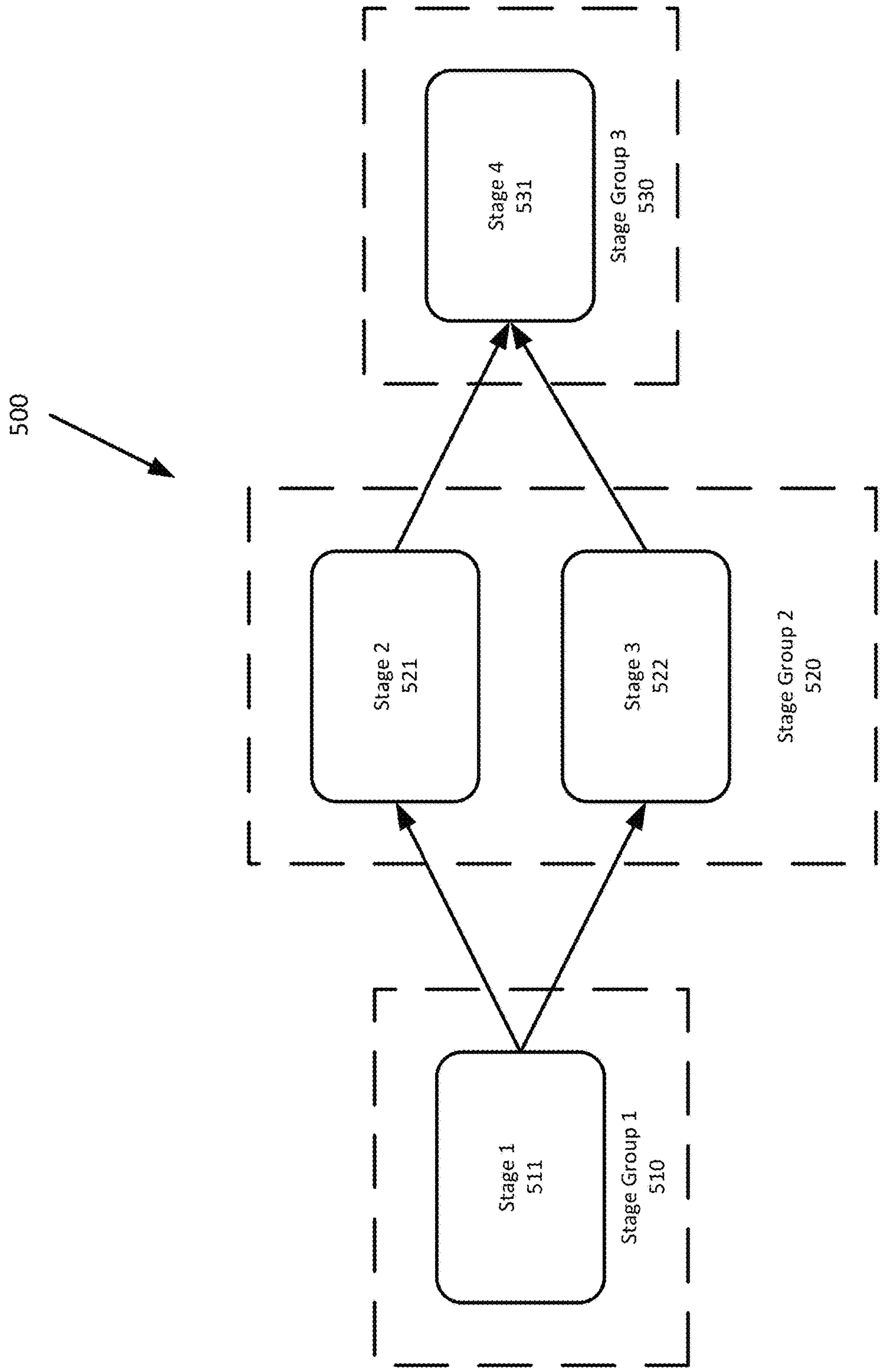
FIG. 5 illustrates an exemplary embodiment of a direct acyclic graph.

An exemplary embodiment of a DAG of a job 500 is illustrated in FIG. 5. Job 500 includes three stage groups. A first stage group 510 includes a single stage 511, a second stage group 520 includes two stages 521 and 522, and a third stage group 530 includes a single stage 531. In this example, the stages of first stage group 510, e.g., stage 511, are executed first. Once execution of that stage is complete, the stages of second stage group 520, e.g., stages 521 and 522, are executed second. Because stages 521 and 522 are in the same stage group, they are executed in parallel. Once all stages of second stage group 520 are executed, the stages of third stage group 530, e.g., stage 531, are executed.

Next, at step 402, resource broker engine 215 of executor 210 retrieves a stage feature vector and a task feature vector matching each stage of the stage groups identified in step 401. As discussed with respect to FIG. 3, a stage feature vector can include data about previous executions of a stage, such as the partition ratio (i.e., the ratio of expected partition count of a given stage to a partition count of a preceding stage of the job), stage execution time, a maximum and minimum data skewness, and an average data skewness. A task feature vector can include data about previous executions of a task of a stage, such as the minimum and maximum execution time, average execution time, and average task scheduling delay between tasks of a corresponding stage.

Next, at step 403, executor 210 calculates a simulated resource requirement for each stage group. This includes resource broker engine 215 calculating a simulated number of worker containers required to execute the stage in the desired execution time. This calculation can be based on, metadata from the received job and feature vectors stored in runtime statistics database 250, including but not limited to, a desired execution time of a given stage group, a number of partitions of the given stage group, an average task execution time for each task of the give stage, and an average task scheduling delay of the tasks of the given stage. In some embodiments, a simulated resource requirement for each stage group may be determined according to the following equation, which aggregates a resource requirement of each individual stage of a stage group, taking into account any available parallelism thereof:

$$N_{SG} = \frac{\sum_{i=1}^{n} D_i(ST_i + TD_i)}{P \times SGT}$$

where N is the simulated number of worker containers required to execute the stages i of a stage group in the desired execution time of that stage group, SGT represents the desired execution time of the stage group, $D_i$ is the number of partitions of each stage i of the stage group, P represents parallelism of the worker containers available to execute the stage group, $ST_i$ represents the average task execution time for each stage i determined from the retrieved stage feature vector, and $TD_i$ represents an average task scheduling delay as determined from the retrieved task feature vector. Steps 402 and 403 are repeated for each stage group in the received job.

Method 400 is recited with respect to determining a simulated resource requirement of a stage group, which requires a desired execution time to be indicated by the received job, e.g., job 212. However, in alternative embodiments, method 400 may similarly be used to determine a simulated execution time of a stage group when the resource requirement is indicated by the received job. In other words, when the number of worker nodes and/or containers available on cluster 220 are limited to defined number, such as by the metadata of the received job or by physical constraints of the number of worker nodes and worker containers of cluster 220, method 400 can simulate the execution time for the stages and stage groups of the received job. In such embodiments, steps 401 and 402 remain unchanged. At step 403, the equation for the simulated execution time for each stage group is determined by solving the equation for the simulated number of worker containers for each stage group $SG_i$, where the value of N is known as the number of worker containers available on cluster 220 to execute a particular stage group of the received job. An exemplary equation for determining a simulated execution time is therefore:

$$SGT = \frac{\sum_{i=1}^{n} D_i \times (ST_i + TD_i)}{N \times P}$$

The exemplary equations for determining a simulated resource requirement and a simulated execution time assume that a distribution of data across partitions is uniform across each stage group. Where data partitions are not of equal sizes and a data skewness exists, each equation incorporates an additional skewness factor which reflects a difference in execution time of each partition caused by the different data partition sizes.

It will be appreciated by a person of ordinary skill in the art that these equations are exemplary and do not represent the only way to determine an average execution time or a resource requirement for each stage group of a job.

Then, at optional step 404, the total simulated execution time of the job is determined by summing each simulated execution time of each stage group together.

In embodiments where no job-feature vectors are stored in runtime statistics database 250 having a data pipeline ID that matches the data pipeline ID of the received job, then executor 210 determines a resource requirement according to similar feature vector that shares a similar data transformation. Executor 210 can follow the steps of method 400 without consideration of data pipeline ID for determining a similar feature vector.

At step 104, executor 210 can schedule a first stage group of job 212 on a first set of one or more worker containers of cluster 220 for execution. This can include scheduling module 216 of executor 210 sending a request to control panel 240 of cluster 220 for one or more worker containers based on the desired number of worker containers for the first stage group of job 212 determined in step 103.

This request causes scheduler 224 of control panel 240 to allocate the desired number of worker containers to the first stage group for execution of each task of the stages that make up the first stage group in order to execute the tasks of the stage group within the expected execution time.

Alternatively, step 104 of scheduling the first stage group can include creating one or more warmup containers. This may occur in embodiments where cluster environment 200 includes a resource broker engine 260 external to cluster 220. In such embodiments, resource broker 260 receives job 212 prior to job 212 being received by resource broker engine 215 of executor 210. Resource broker 260 can then perform steps 102 and 103 of method 100 to determine the resource requirement and estimated execution time of the job by determining the resource requirement of each stage group in the job. Once the resource requirement for each stage group is determined, resource broker 260 transmits a request to control panel 240 requesting one or more worker containers for executing the first stage group of job 212. This can cause schedule 224 of control panel 240 to create one or more warmup containers on worker nodes of cluster 220 to be used to execute the first stage group of job 212. If executing the first stage group of job 212 requires more resources than currently available on cluster 220 (i.e. more available containers on nodes of cluster 220), then this request can cause scaler 225 of control panel 240 to scale up cluster 220 by bringing additional worker nodes in cluster 220 online or adding additional worker nodes to cluster 220 for executing the first stage group of job 212 while control panel 240 initializes and prepares to execute job 212. Creating one or more warmup containers can include scheduler 224 preparing a first set of one or more worker containers on one or more worker nodes of cluster 220 to execute the tasks of the first stage group of job 212. This preparation can include, for example, designating each worker container in the first set for execution of the first stage group, bringing the worker containers of the first set online if they are offline, installing software, binaries, or other computing information onto the worker containers of the first set to enable those worker containers to execute the tasks of the first stage group, and other processes necessary to prepare the worker containers to execute the first stage of job 212.

Next, at step 105, executor 210 requests a second set of one or more worker containers for execution of a first subsequent stage group of job 212 based on the resource requirement of the first subsequent stage group of job 212. This can include scheduling module 216 of executor 210 sending a request to control panel 240 defining a number of worker containers required to execute the first subsequent stage group corresponding to the resource requirement for that stage group determined at step 103. This request causes scheduler 224 to schedule a first set of one or more warmup containers on the worker nodes of cluster 220 by designating one or more worker containers for execution of the first subsequent stage group. If scheduler 224 determines that there are not enough worker containers available on cluster 220, then scaler 225 scales up additional worker nodes by bringing those computing resource online, and scheduler 224 schedules one or more warmup containers as needed to execute the first subsequent stage group. This request is sent proactively, before execution of the first stage group is complete in order to reduce the scheduling delay between the first stage group and the first subsequent stage group. As such, creating one or more warmup containers for the first subsequent stage group can further be based on a task scheduling delay and a data skewness determined from the stage feature vector and the task feature vector retrieved from the runtime statistics database 250 at step 103, including by method 400. Taking these data elements into consideration for scaling additional nodes in cluster 220 helps ensure that the warmup containers are created in enough advanced time to execute subsequent stage groups of job 212 within the estimated execution time of the stage group. Because different stage groups are executed sequentially and not in parallel, creating warmup containers for the first subsequent stage group while the first stage group is being executed reduces delays related to transitioning from the first stage group to the first subsequent stage group (i.e., a task scheduling delay). By reducing the task scheduling delay, stage groups can be executed more efficiently to help ensure that actual execution times meet the desired or estimated execution time of each stage group and the desired execution time of the overall job without requiring excessive resource allocation.

Next, at step 106, executor 210 schedules the first subsequent stage group of job 212 on worker containers of the second set of one or more worker containers of cluster 220. This can include scheduling module 216 of executor 210 scheduling the one or more tasks of the first subsequent stage group on respective worker containers of the second set of one or more worker containers of cluster 220. The worker containers of the second set can include the one or more warmup containers created at step 105 for the first subsequent stage group of job 212 as well as the one or more worker containers used at step 104 to execute the first stage group of job 212. Because many of the worker containers in the second set used to execute the first subsequent stage group have been proactively created as warmup containers prior to completion of the execution of the first stage group, the task scheduling delay of transitioning from the first stage group to the first subsequent stage group is greatly reduced, resulting in an actual execution time of the first subsequent stage group that more closely matched the estimated execution time of the stage group determined in step 103.

Steps 105 and 106 of method 100 are repeated for each subsequent stage group of job 212 until all stage groups have been scheduled. For example, using the exemplary DAG illustrated in FIG. 5, first stage group 510 can be scheduled first according to step 104 of method 100. While first stage group 510 is being executed, executor 210 can perform step 105 and request a set of worker containers from control panel 240 for second stage group 520, which causes scheduler 224 to schedule a set of warmup containers and can cause 225 to create one or more warmup nodes if additional worker containers are needed to meet the number of worker containers requested by executor 510 to execute second stage group 520 in the desired execution time, as determined in step 103. Once execution of first stage group 510 is complete, executor 210 can perform step 106 and schedule second stage group 520 on the warmup containers of the set of worker containers requested at step 105 for second stage group 520. This scheduling on the warmup containers causes the warmup containers to be converted to worker containers, which have a higher priority than the warmup containers. While second stage group 520 is executed, executor 210 returns to step 105 and requests a set of worker containers for third stage group 520 from control panel 240 based on the resource requirement of third stage group 520 determined at step 103. This request causes scheduler 224 to create a set of one or more worker containers and can cause scaler 225 to create one or more warmup nodes if additional worker containers are needed to meet the number of worker containers requested by executor 510 to execute third stage group 530 in the desired execution time as determined in step 103. Once execution of second stage group 520 is complete, executor 210 can perform step 106 and schedule third stage group 530 on the warmup containers of the set of worker containers requested at step 105 for this stage group 530. Because job 500 only includes three stage groups, method 100 would terminate upon completion of execution of third stage group 530.

In some embodiments, a data skewness present in the data partitions of a stage group can cause the actual execution time of the stage group to be different than the estimated execution time determined in step 103 using the number of worker containers determined in step 103. This deviation in actual execution time from expected execution time can result in failure to meet the desired execution time of job 212.

In order to address this deviation, runtime statistics complier 226 of executor 210 can receive runtime statistics of a stage group upon completion of execution of that stage group and use that runtime statistics to schedule the next stage group in step 106. These runtime statistics can indicate the actual execution time of the executed stage group. Executor 210 can then compare this actual execution time to the expected execution time determined in step 103. If the actual execution time is greater than the expected, then executor 210 can utilize additional worker containers beyond the number determined in step 103 for the next stage group in order to execute the next stage group faster than the expected execution time determined in step 103 to make up for the time lost in executing the previous stage group. Conversely, if the actual execution time is smaller than the expected, then executor 210 can utilize fewer worker containers than the number determined in step 103 for the next stage group in order to execute the next stage group more slowly than the expected execution time determined in step 103 for a more efficient use of resources on the cluster.

Adjusting the number of worker containers for a subsequent stage group based on the actual execution time of a preceding stage group in this way ensures that the actual execution time of the overall job, e.g., job 212, is as close to the desired execution time for job 212 as possible.

Again using FIG. 5 as an example, say executor 210 determined an expected execution time of first stage group to be five minutes utilizing five worker containers. However, due to skewness in the size of the data partitions of the first stage group, the actual execution time is seven minutes, two minutes more than expected, which sets the overall job execution time using the resource requirement determined in step 103 behind. To ensure that job 500 is executed within the desired execution time, executor 210 can adjust the resource requirement for the next stage group to meet the desired execution time of job 500 by executing the next stage group faster to make up the lost time. This can include, for example, scheduling second stage group 520 on more worker containers than determined in step 103 in order to execute second stage group faster than the expected execution time determined in step 103. The same process is performed once second stage group 520 is executed, and executor 210 can adjust the resource requirement of third stage group 530 to account for deviations in the execution time of second stage group 520.

Runtime statistics compiler 226 can collect additional statistics about the execution of job 212. These statistics can include job-level, stage-level, and task-level statistics, such as execution time of each respective job, stage group, stage within each stage group, and task within each stage. Runtime statistics complier 226 can collect any data corresponding to the sets of feature keys and sets of feature values described with reference to the feature vectors in FIG. 3. Statistics complier 226 can collect additional information about the execution of the job, including but not limited to, a number of stages run in parallel in each stage group, a number of partitions per stage and/or per stage group, or a worker container task scheduler delay reflecting the delay in scheduling a subsequent task on a worker container after a prior task is completed. This list is not intended to be exhaustive and a person of ordinary skill in the art will appreciate that further statistics about the execution of a job may be collected by runtime statistics compiler during the execution of the job.

Figure 6:
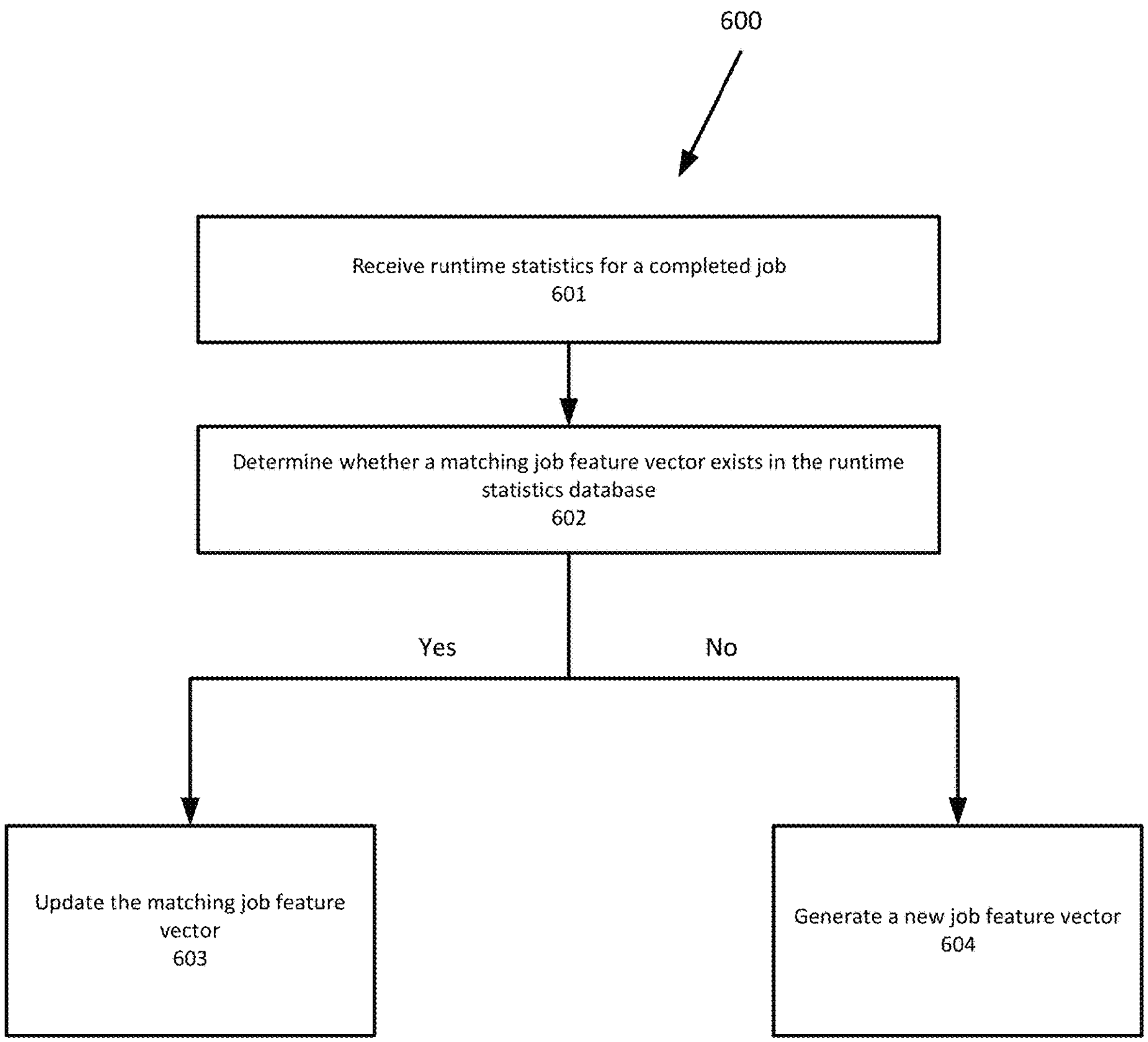
FIG. 6 illustrates a flowchart for processing runtime statistics of an execution job according to an exemplary embodiment.

Once job execution is complete and runtime statistics have been complied by runtime statistics compiler 226, executor 210 transmits the runtime statistics to runtime statistics analyzer 217, which performs method 600 illustrated in FIG. 6 to update runtime statistics database 250.

At step 601, runtime statistics analyzer 217 receives runtime statistics of an executed job, e.g., job 212, from executor 210. This can include runtime statistics analyzer 217 receiving runtime statistics of executed job 212 from runtime statistics compiler 226 of executor 210. In some embodiments, runtime statistics compiler 226 automatically transmits runtime statistics for job 212 to runtime statistics analyzer 217 when the final stage group of job 212 is executed. Alternatively, runtime statistics compiler 226 can transmit runtime statistics upon receiving a request from analyzer 217.

Next, at step 602, after receiving the runtime statistics, runtime statistics analyzer 217 can determine whether a matching job feature vector in runtime statistics database 250 corresponding to job 212 exists. This can include runtime statistics analyzer 217 querying runtime statistics database 250 to identify a matching job feature vector corresponding to job 212 based on the runtime statistics received from runtime statistics compiler 226. If a matching job feature vector exists, then runtime statistics analyzer 217 proceeds to step 603 of method 600. If a matching job feature vector does not exist, then runtime statistics analyzer 217 proceeds to step 604 of method 600.

A matching job feature vector exists when runtime statistics database 250 includes a job feature vector having a set of job feature keys that identically match the job feature keys of job 212, including the data pipeline ID, the machine type, source and data type, DAG, input data size within the acceptable tolerance, data partition size, and number of worker containers used to execute job 212. A job feature vector in runtime statistics database 250 is not a matching job feature vector if one or more of these job feature keys of execute job 212 is different than the job feature keys of the job feature vector.

If there is a matching job feature vector, runtime statistics analyzer 217 performs step 603 and updates the matching job feature vector with the runtime statistics of job 212. This can include runtime statistics analyzer 217 fetching the matching job feature vector from runtime statistics database 250 and updating the set of job feature values with the job-level runtime statistics of job 212, including but not limited to, total execution time of job 212. Runtime statistics analyzer 217 then returns the updated job feature vector to runtime statistics database 250. Updating the matching job feature vector can further include updating one or more stage feature vectors and one or more task feature vectors that correspond to the matching job feature vector. This can include runtime statistics analyzer 217 fetching the one or more stage and task feature vectors that correspond to the matching job feature vector from runtime statistics database 250 and updating the set of stage and task feature values with the runtime statistics specific to stage level and task level execution of job 212. As described with respect to FIG. 3, these stage and task feature values can include execution time of a stage, execution time of a task, a skewness of the data in a stage, a partition ratio, a task scheduling delay, and a stage scheduling delay. Runtime statistics analyzer 217 then returns the updated stage and task feature vectors to runtime statistics database 250.

If there is no matching job feature vector in the runtime statistics database, then runtime statistics analyzer 217 performs step 604 and generates a new job feature vector for executed job 212. This can include runtime statistics analyzer 217 generating a job feature vector with a set of job vector keys and a set of job feature values determined from the runtime statistics of executed job 212 received by runtime statistics analyzer 217. Runtime statistics analyzer 217 can further generate one or more stage feature vectors and one or more task feature vectors according to the runtime statistics of job 212 corresponding to the stages and tasks of job 212. These stage and task feature vectors can include a set of stage and task keys and a set of stage and task values, respectively, determined from the runtime statistics of job 212. Once the new feature vectors are generated, runtime statistics analyzer 217 can transmit the new feature vectors to runtime statistics database 250.

Figure 7A:
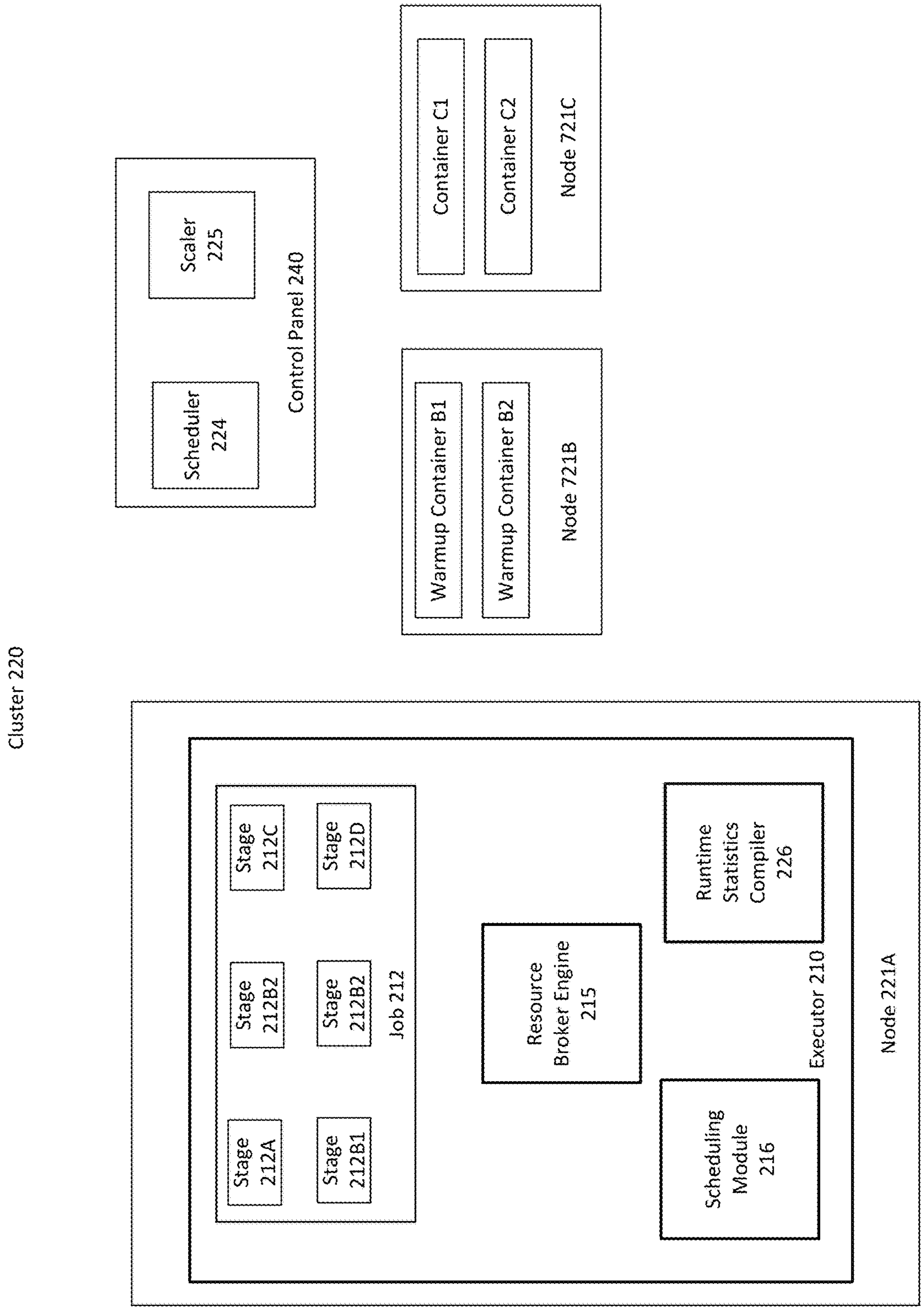
FIG. 7A-C illustrates an exemplary embodiment of scheduling a job on a cluster.
Figure 7B:
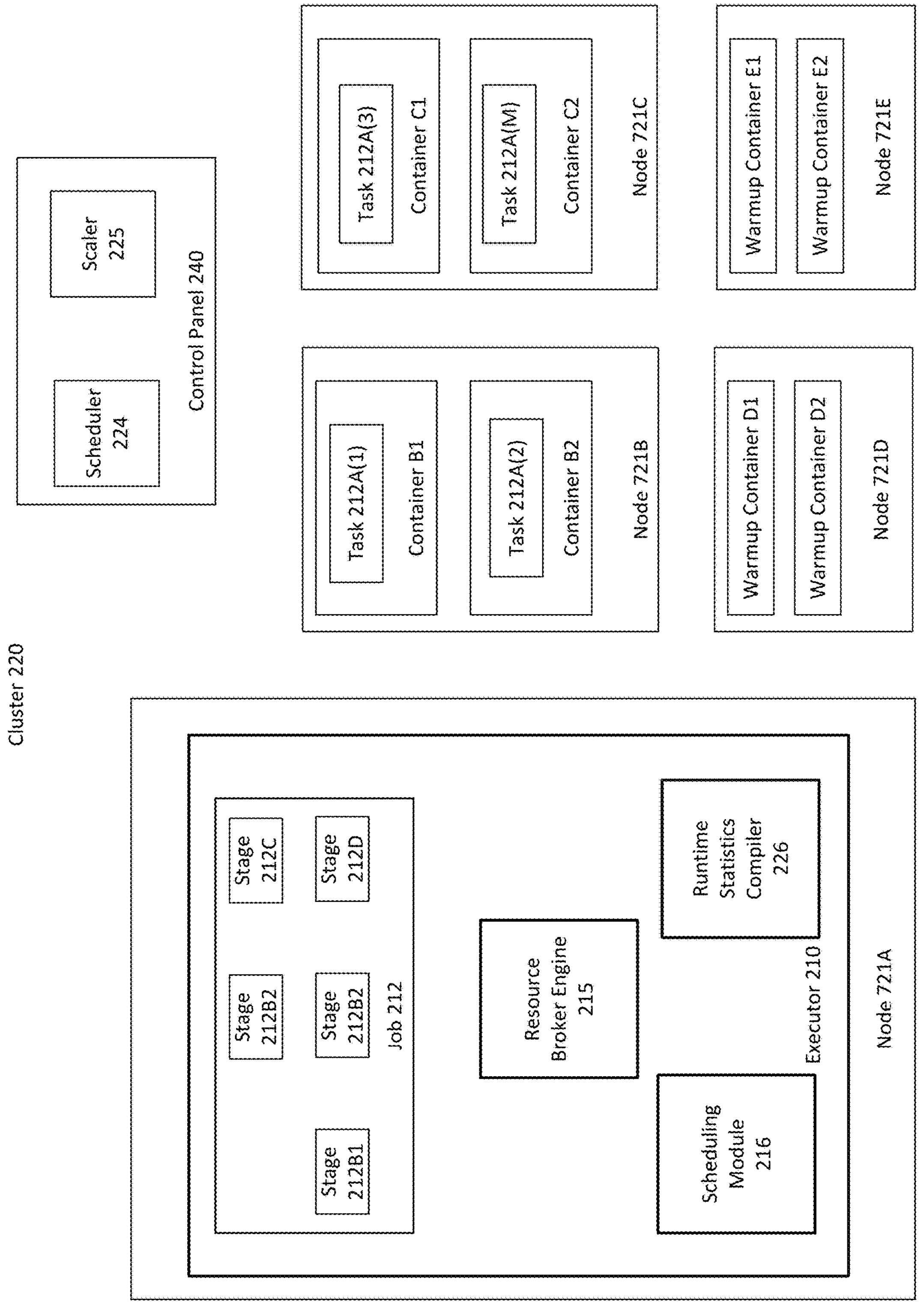
Figure 7C:
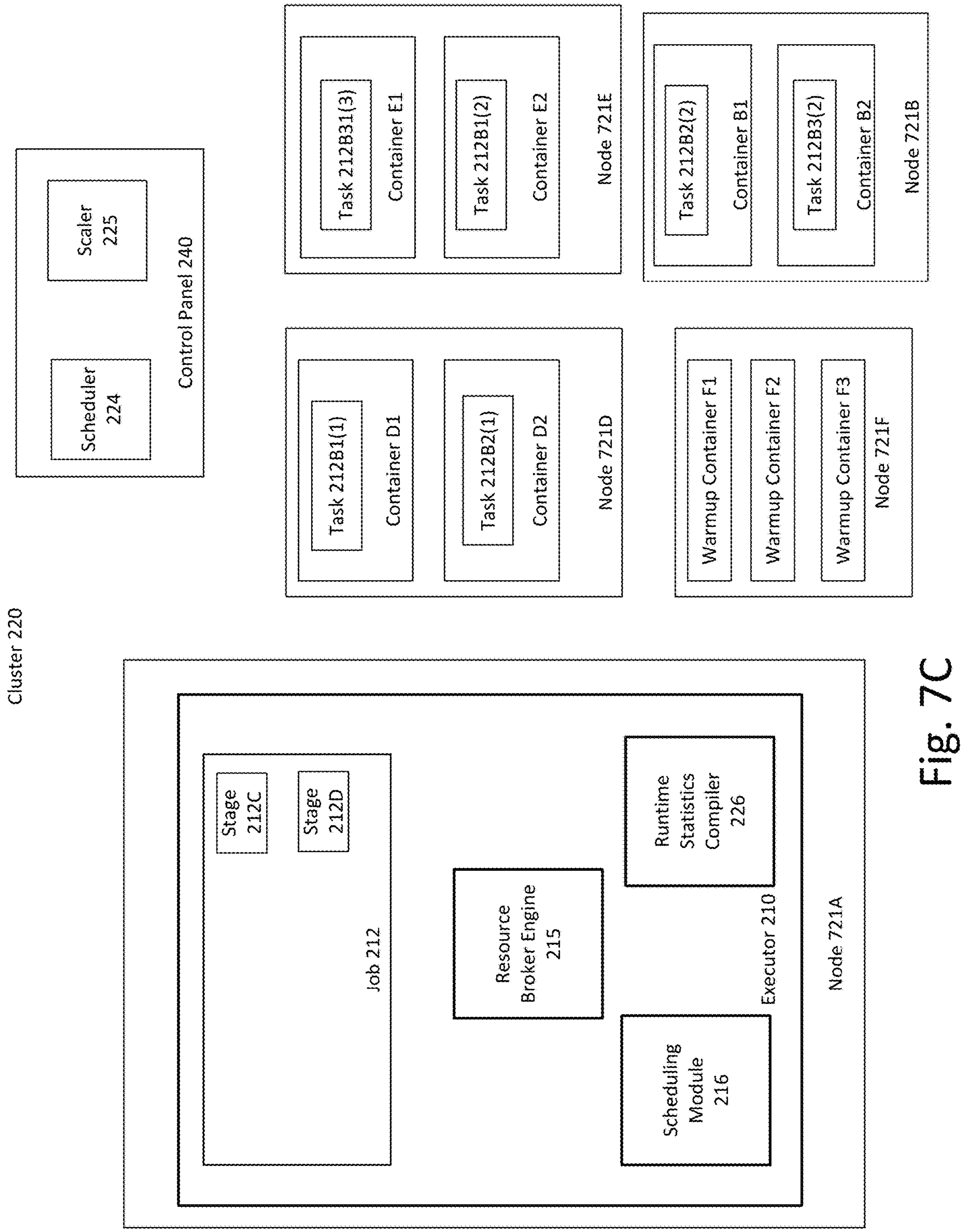

FIGS. 7A-C illustrate an exemplary embodiment of scheduling and scaling a plurality of stages of a received job, as described in steps 104, 105, and 106 of method 100 described above. Runtime statistics analyzer 217, data source 230, runtime statistics database 250, and resource broker 260, which are part of cluster environment 200 but are not part of cluster 220 in FIG. 2, are omitted from FIGS. 7A-C for simplicity of illustration.

First, as illustrated in FIG. 7A, cluster 220 receives job 212. Job 212 can be received on cluster 220 by a master container 710 on a node 721A that is initialized as executor 210 for scheduling the stage groups of job 212. In some embodiments, prior to job 212 being received by cluster 220, scheduler 224 can schedule a set of one or more warmup containers B1 and B2, and scaler 225 can scale up one or more additional worker nodes on cluster 220 if there are not enough available resources on cluster 220 to execute the first stage group, for executing the first stage group of job 212 based on a request received from resource broker 260. Scaling up one or more additional worker nodes on cluster 220 can include scaler 225 adding new worker nodes to cluster 220 or bringing online additional worker nodes already on cluster 220 that were offline. This processing of adding new nodes or bringing new nodes online can include validating the workers nodes being added to the cluster to confirm that a particular worker node is capable of running on cluster 220, including confirming hardware and software compatibility (i.e., if worker nodes on cluster 220 are required to be of a same instance type), shared scheduling properties, and availability to be added to cluster 220.

Next, in FIG. 7B, scheduling module 216 schedules the first stage group of job 212 on the cluster. As shown, the first stage group of job 212 includes a single stage 212A that include M total tasks to be executed. Scheduling module 216 schedules a first task 212A(1) on worker container B1 of worker node 721 B, a second task 212A(2) on worker container B2 of worker node 721B, a third task 212A(3) on worker container C1 of worker node 721C, and an Mth task on worker container C2 of worker node 721C. The allocation of tasks of stage 212A illustrated in FIG. 7B is merely illustrative and is dependent on the number of worker containers required for execution of the first stage group within the expected execution time of the first stage group. As illustrated, the first stage group that includes stage group 212A is allocated 4 worker containers, which are responsible for executing all M tasks of the first stage group. Thus, as a task is executed by a worker container, a subsequent task can be scheduled on that worker container until all tasks are executed. Here, for example, a subsequent task 212A(4) can be scheduled on worker container B1 after task 212A(1) is executed, a subsequent task 212A(5) can be scheduled on worker container B2 after task 212A(2) is executed, and so on, until all M tasks of the first stage are executed.

While worker containers B1, B2, C1, and C2 execute tasks 212A(M) of stage 212A of the first stage group, scheduling module 216 can send a request to control panel 240 for a set of one or more worker containers that will be used to execute the next stage group of job 212. This request causes scheduler 224 of control panel 240 to schedule a set of one or more warmup containers, e.g., warmup containers D1 and D2 on worker node 721D and warmup containers E1 and E2 on worker node 721E, based on the number of worker containers requested, and scaler 225 can scale up additional nodes, such as nodes 721D and 721E, if cluster 220 does not have enough available resource to execute the next stage group.

Next, in FIG. 7C, once execution of the first stage group is complete, scheduling module 216 of executor 210 schedules the next stage group on cluster 220. In this exemplary embodiment, stages 212B1, 212B2, and 212B3 are in the second stage group, which means they are executed in parallel. Scheduling module 216 can therefore schedule each task of stages 212B1, 212B2, and 212B3 of the second stage group on the containers corresponding to the warmup containers scheduled by scheduler 224 while the first stage group was being executed (e.g., in FIG. 7B). In this exemplary embodiments, a first task 212B1(1) of stage 212B1 can be scheduled on worker container D1 of worker node 721D, a first task 212B2(1) of stage 212B2 can be scheduled on worker container D2 of worker node 721D, a first task 212B3(1) of stage 212B3 can be scheduled on worker container E1 of worker node 721E, a second task 212B1(2) of stage 212B1 can be scheduled on worker container E2 of worker node 721E, and so on, until all M tasks of each stage of the second stage group are executed. When executor 210 schedules the tasks of stage 212B1, 212B2, and 213B2 on the warmup containers, the warmup containers are converted to worker containers, which as described above, have a higher priority than warmup containers.

While FIG. 7A and FIG. 7B illustrate a new set of worker nodes and worker containers executing subsequent stage groups of job 212, it will be appreciated that resources used to execute a prior stage group can, and often are, used for executing subsequent stage group. This is illustrated in FIG. 7C, which illustrates worker containers B1 and B2 executing tasks 212B2(2) and 212B3(2) of the second stage group after executing the tasks of the first stage group in FIG. 7B.

While these tasks are being executed, scheduling module 216 can send a request to control panel 240 for another set of one or more worker containers to execute the next stage group of job 212. Upon receiving this request, scheduler 224 can schedule a set of one or more warmup containers, e.g., warmup containers F1, F2, and F3 on worker node 721F, based on the number of worker containers requested by scheduling module 216. The processes illustrated in FIGS. 7B and 7C are repeated until all stage groups of job 212 have been executed.

Figure 8:
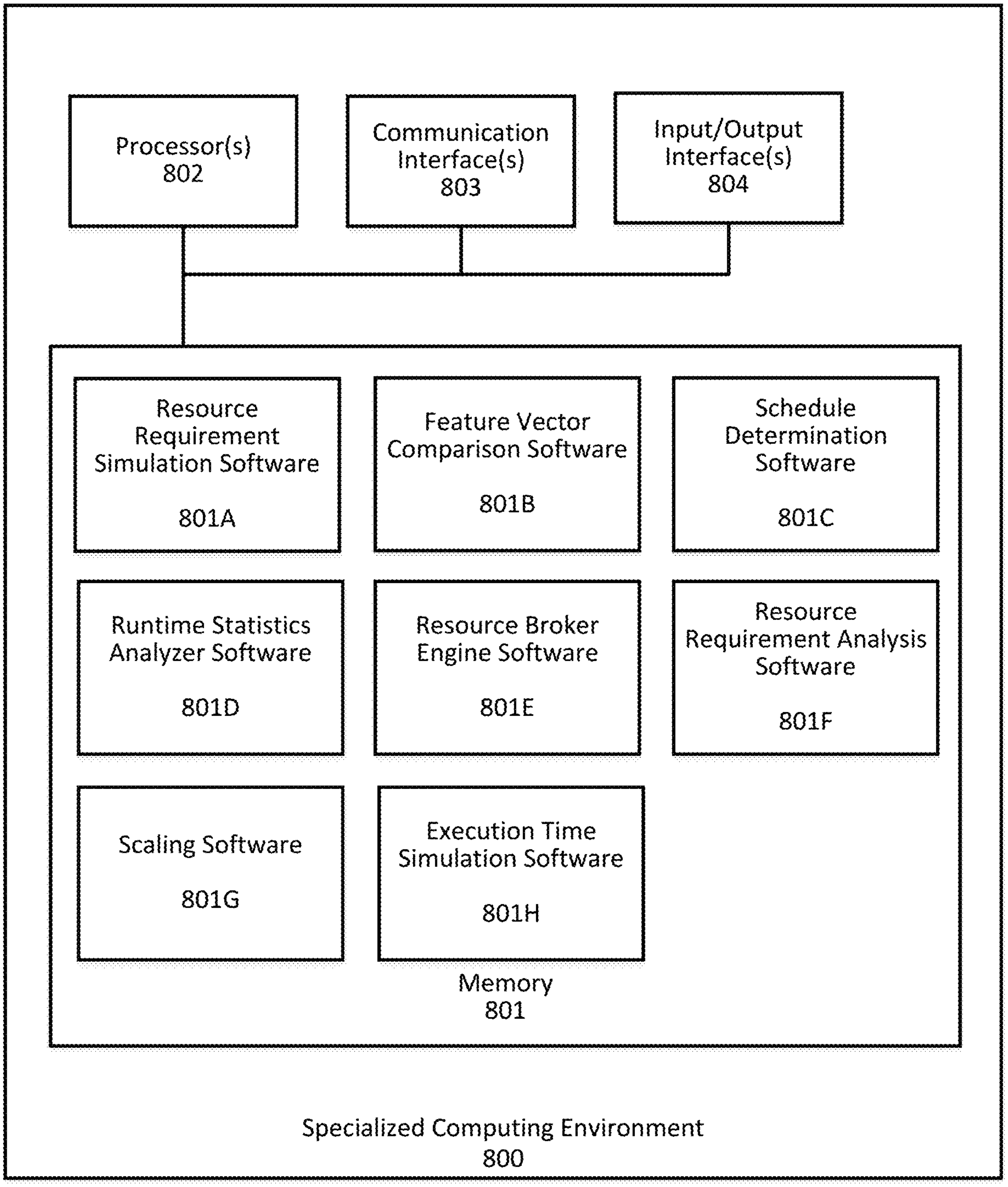
FIG. 8 illustrates a computing environment for scheduling one or more jobs on a cluster according to exemplary embodiments.

FIG. 8 illustrates the components of a specialized computing environment 800 configured to perform the processes described herein. Specialized computing environment 800 is a computing device that includes a memory 801 that is a non-transitory computer-readable medium and can be volatile memory (e.g., registers, cache, RAM), non-volatile memory (e.g., ROM, EEPROM, flash memory, etc.), or some combination of the two. Specialized computing environment can be an executor communicatively coupled with one or more clusters.

As shown in FIG. 8, memory 801 can store simulation software 801A, feature vector comparison software 801B, schedule determination software 801C, runtime statistics analyzer software 801D, resource broker engine software 801E, resource requirement analysis software 801F, scaling configuration software 801G, and execution time simulation software 801H. Each of the software components in memory 801 store specialized instructions and data structures configured to perform the corresponding functionality and techniques described herein.

All of the software stored within memory 801 can be stored as a computer-readable instructions, that when executed by one or more processors 802, cause the processors to perform the functionality described with respect to FIGS. 1-7.

Processor(s) 802 execute computer-executable instructions and can be a real or virtual processors. In a multiprocessing system, multiple processors or multicore processors can be used to execute computer-executable instructions to increase processing power and/or to execute certain software in parallel.

Specialized computing environment 800 additionally includes a communication interface 803, such as a network interface, which is used to communicate with devices, applications, or processes on a computer network or computing system, collect data from devices on a network, and implement encryption/decryption actions on network communications within the computer network or on data stored in databases of the computer network. The communication interface conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Specialized computing environment 800 further includes input and output interfaces 804 that allow users (such as system administrators) to provide input to the system to display information, to edit data stored in memory 801, or to perform other administrative functions.

An interconnection mechanism (shown as a solid line in FIG. 8), such as a bus, controller, or network interconnects the components of the specialized computing environment 800.

Input and output interfaces 804 can be coupled to input and output devices. For example, Universal Serial Bus (USB) ports can allow for the connection of a keyboard, mouse, pen, trackball, touch screen, or game controller, a voice input device, a scanning device, a digital camera, remote control, or another device that provides input to the specialized computing environment 800.

Specialized computing environment 800 can additionally utilize a removable or non-removable storage, such as magnetic disks, magnetic tapes or cassettes, CD-ROMs, CD-RWs, DVDs, USB drives, or any other medium which can be used to store information and which can be accessed within the specialized computing environment 800.

Applicant has discovered a novel method, apparatus, and computer-readable medium for efficiently classifying a data object of unknown type. As explained above, the disclosed systems and methods are two to three times faster as compared to a traditional approach and achieve a two to three times reduction in the number of classification attempts before successful classification.

The disclosed systems and methods also provides a novel approach to choosing an order in which the data objects' classifiers should be queried and has many additional advantages. In particular, a lightweight data object model is used which can be instantiated both manually and automatically and is not computationally expensive to instantiate. The discloses system and method also allows users and systems to establish a threshold beyond which further classification attempts become irrelevant, saving resources on applying classifiers when the probability of success is low. The disclosed approach also makes blocking rules redundant and simplifies the overall data objects classification architecture. The implementation of the classification order predicting components is also transparent to the existing data objects' classification implementations, making it applicable to data objects of varied types.

Having described and illustrated the principles of our invention with reference to the described embodiment, it will be recognized that the described embodiment can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiment shown in software may be implemented in hardware and vice versa.

In view of the many possible embodiments to which the principles of our invention may be applied, we claim as our invention all such embodiments as may come within the scope and spirit of the following claims and equivalents thereto.

We claim:

1. A method executed by one or more computing devices of an executor for job scheduling on a cluster comprising a plurality of nodes, the method comprising:

receiving, by the executor, a job, the job comprising a plurality of stages, each stage comprising one or more tasks, wherein each task is configured to perform a transformation on data input to the task;

requesting, by the executor, historical data from a database based at least in part on metadata associated with one or more stages of the plurality of stages of the job and environmental configuration data of the cluster;

determining, by the executor, a resource requirement of each stage group in a plurality of stage groups based at least in part on a desired execution time of the job, the historical data, the environmental configuration data of the cluster, and an input data size of each stage group, wherein each stage group comprises one or more stages in the plurality of stages, wherein stages in a stage group comprising a plurality of stages are configured to be executed in parallel;

scheduling, by the executor, a first stage group in the plurality of stage groups on the cluster for execution, wherein each task in the first stage group is executed by a worker container of a node in the plurality of nodes of the cluster;

requesting, by the executor, one or more new worker containers on the cluster for execution of a second stage group configured to be executed after the first stage group, wherein requesting the one or more new worker containers causes the cluster to create one or more warmup containers, wherein each warmup container has a lower priority than a worker container; and scheduling, by the executor, at least a portion of the second stage group on the one or more warmup containers based at least in part on completion of execution of the first stage group, wherein scheduling the second stage group on the one or more warmup containers converts the one or more warmup containers to one or more worker containers.

2. The method of claim 1, wherein the historical data comprises:

a plurality of job feature vectors comprising job-level runtime characteristics of jobs previously executed on the cluster;

one or more stage feature vectors comprising stage-level runtime characteristics of stages previously executed by the cluster; and one or more task feature vectors comprising runtime characteristics of tasks previously executed by the cluster.

3. The method of claim 2, wherein, the job-level runtime characteristics comprise a maximum execution time, a minimum execution time, and an average execution time of previous executions of jobs by the cluster, the stage-level runtime characteristics comprise a minimum data skewness, a maximum data skewness, an average data skewness, a ratio of a total data size of a particular stage and a number of tasks in the particular stage, and an average execution time of the particular stage corresponding to previous executions of stages by the cluster, and the task-level runtime characteristics comprise a maximum execution time, a minimum execution time, an average execution time of a particular task, and an average task scheduling delay corresponding to previous executions of tasks by the cluster.

4. The method of claim 2, further comprising:

receiving, by the executor, runtime statistics for the job after the job is executed by the cluster, the runtime statistics comprising job-level, stage-level, and task-level metadata about execution of the job by the cluster; and determining, by the executor, whether a matching feature vector corresponding to the job exists in the database; and if a given one of a stage feature vector, a task feature vector, and a job feature vector corresponding to the job, its stages, and its tasks exists in the database, the method further comprises updating, by the executor, corresponding feature vectors with the runtime statistics and if one of a stage feature vector, a task feature vector, and a job feature vector corresponding to the job, its stages, and its tasks does not exist in the database, the method further comprises generating, by the executor, new feature vectors corresponding to the job, its stages, and its tasks with the runtime statistics.

5. The method of claim 1, wherein determining a resource requirement of each stage group in a plurality of stage groups comprises:

determining, by the executor, whether a matching job feature vector is stored in the database; and if a matching job feature vector is stored in the database, identifying, by the executor, a resource requirement of the job defined in the matching job feature vector, and if no matching job feature vector is stored in the database, determining, by the executor, a simulated resource requirement, wherein determining a simulated resource requirement comprises:

identifying, by the executor, one or more stage groups of the job, wherein each stage group comprises one or more stages;

retrieving, by the executor, a stage feature vector and a task feature vector corresponding to each stage of each stage group, wherein each stage feature vector and each task feature vector is associated with a corresponding job feature vector stored in the database; and calculating, by the executor and based at least in part on the retrieved stage feature vectors and task feature vectors, a simulated resource requirement for each stage group.

6. The method of claim 5, wherein the simulated resource requirement for each stage group of the job is determined based at least in part on a desired execution time of a respective stage group, an input partition count for the respective stage group, an average execution time for the respective stage group determined from a similar feature vector from the database, and an average task scheduling delay.

7. The method of claim 1, further comprising:

requesting, by the executor, one or more second new worker containers on the cluster for execution of a third stage group to be executed after the second stage group, wherein requesting the one or more second new worker containers causes the cluster to create one or more second warmup containers; and scheduling, by the executor and based at least in part on completion of execution of the second stage group, the third stage group on the one or more second warmup containers, wherein scheduling the third stage group on the one or more second warmup containers converts the one or more second warmup containers to one or more worker containers.

8. An apparatus for job scheduling on a cluster comprising a plurality of nodes, the apparatus comprising:

one or more processors; and one or more memories operatively coupled to at least one of the one or more processors and having instructions stored thereon that, when executed by at least one of the one or more processors, cause at least one of the one or more processors to:

receive a job, the job comprising a plurality of stages, each stage comprising one or more tasks, wherein each task is configured to perform a transformation on data input of the task;

request historical data from a database based at least in part on metadata associated with one or more stages of the plurality of stages of the job and environmental configuration data of the cluster;

determine a resource requirement of each stage group in a plurality of stage groups based at least in part on a desired execution time of the job, the historical data, the environmental configuration data of the cluster, and an input data size of each stage group, wherein each stage group comprises one or more stages in the plurality of stages, wherein stages in a stage group comprising a plurality of stages are configured to be executed in parallel;

schedule a first stage group in the plurality of stage groups on the cluster for execution, wherein each task in the first stage group is executed by a worker container of a node in the plurality of nodes of the cluster;

request one or more new worker containers on the cluster for execution of a second stage group configured to be executed after the first stage group, wherein requesting the one or more new worker containers causes the cluster to create one or more warmup containers, wherein each warmup container has a lower priority than a worker container; and schedule at least a portion of the second stage group on the one or more warmup containers based at least in part on completion of execution of the first stage group, wherein scheduling the second stage group on the one or more warmup containers converts the one or more warmup containers to one or more worker containers.

9. The apparatus of claim 8, wherein the historical data comprises:

a plurality of job feature vectors comprising job-level runtime characteristics of jobs previously executed on the cluster;

one or more stage feature vectors comprising stage-level runtime characteristics of stages previously executed by the cluster; and one or more task feature vectors comprising runtime characteristics of tasks previously executed by the cluster.

10. The apparatus of claim 9, wherein, the job-level runtime characteristics comprise a maximum execution time, a minimum execution time, and an average execution time of previous executions of jobs by the cluster, the stage-level runtime characteristics comprise a minimum data skewness, a maximum data skewness, an average data skewness, a ratio of a total data size of a particular stage and a number of tasks in the particular stage, and an average execution time of the particular stage corresponding to previous executions of stages by the cluster; and the task-level runtime characteristics comprise a maximum execution time, a minimum execution time, an average execution time of a particular task, and an average task scheduling delay corresponding to previous executions of tasks by the cluster.

11. The apparatus of claim 9, wherein at least one of the one or more memories has further instructions stored thereon that, when executed by at least one of the one or more processors, cause at least one of the one or more processors to:

receive runtime statistics for the job after the job is executed by the cluster, the runtime statistics comprising job-level, stage-level, and task-level metadata about execution of the job by the cluster; and determine whether a matching feature vector corresponding to the job exists in the database; and if a given one of a stage feature vector, a task feature vector, and a job feature vector corresponding to the job, its stages, and its tasks exists in the database, update the corresponding feature vectors with the runtime statistics, and if one of a stage feature vector, a task feature vector, and a job feature vector corresponding to the job, its stages, and its tasks does not exist in the database, generate new feature vectors corresponding to the job, its stages, and its tasks with the runtime statistics.

12. The apparatus of claim 8, wherein the instructions that cause at least one of the one or more processors to determine a resource requirement of each stage group in a plurality of stage groups further cause at least one of the one or more processors to:

determine whether a matching job feature vector is stored in the database, if a matching job feature vector is stored in the database, identify a resource requirement of the job defined in the matching job feature vector, and if no matching job feature vector is stored in the database, determine a simulated resource requirement, wherein the instructions that cause at least one of the one or more processors to determine a simulated resource requirement further cause at least one of the one or more processors to:

identify one or more stage groups of the job, wherein each stage group comprises one or more stages;

retrieve a stage feature vector and a task feature vector corresponding to each stage of each stage group, wherein each stage feature vector and each task feature vector is associated with a corresponding job feature vector stored in the database; and calculate, based at least in part on the retrieved stage feature vectors and task feature vectors, a simulated resource requirement for each stage group.

13. The apparatus of claim 12, wherein the simulated resource requirement for each stage group of the job is determined based at least in part on a desired execution time of a respective stage group, an input partition count for the respective stage group, an average execution time for the respective stage group determined from a similar feature vector from the database, and an average task scheduling delay.

14. The apparatus of claim 8, wherein at least one of the one or more memories has further instructions stored thereon that, when executed by at least one of the one or more processors, cause at least one of the one or more processors to:

request one or more second new worker containers on the cluster for execution of a third stage group to be executed after the second stage group, wherein requesting the one or more second new worker containers causes the cluster to create one or more second warmup containers; and schedule, based at least in part on completion of execution of the second stage group, the third stage group on the one or more second warmup containers, wherein scheduling the third stage group on the one or more second warmup containers converts the one or more second warmup containers to one or more worker containers.

15. At least one non-transitory computer-readable medium storing computer-readable instructions for job scheduling on a cluster comprising a plurality of nodes that, when executed by one or more computing devices of an executor, cause at least one of the one or more computing devices to:

receive a job, the job comprising a plurality of stages, each stage comprising one or more tasks, wherein each task is configured to perform a transformation on data input of the task;

request historical data from a database based at least in part on metadata associated with one or more stages of the plurality of stages of the job and environmental configuration data of the cluster;

determine a resource requirement of each stage group in a plurality of stage groups based at least in part on a desired execution time of the job, the historical data, the environmental configuration data of the cluster, and an input data size of each stage group, wherein each stage group comprises one or more stages in the plurality of stages, wherein stages in a stage group comprising a plurality of stages are configured to be executed in parallel;

schedule a first stage group in the plurality of stage groups on the cluster for execution, wherein each task in the first stage group is executed by a worker container of a node in the plurality of nodes of the cluster;

request one or more new worker containers on the cluster for execution of a second stage group configured to be executed after the first stage group, wherein requesting the one or more new worker containers causes the cluster to create one or more warmup containers, wherein each warmup container has a lower priority than a worker container; and schedule at least a portion of the second stage group on the one or more warmup containers based at least in part on completion of execution of the first stage group, wherein scheduling the second stage group on the one or more warmup containers converts the one or more warmup containers to one or more worker containers.

16. The one or more non-transitory computer-readable medium of claim 15, wherein the historical data comprises:

a plurality of job feature vectors comprising job-level runtime characteristics of jobs previously executed on the cluster;

one or more stage feature vectors comprising stage-level runtime characteristics of stages previously executed by the cluster; and one or more task feature vectors comprising runtime characteristics of tasks previously executed by the cluster.

17. The one or more non-transitory computer-readable medium of claim 16, wherein, the job-level runtime characteristics comprise a maximum execution time, a minimum execution time, and an average execution time of previous executions of jobs by the cluster, the stage-level runtime characteristics comprise a minimum data skewness, a maximum data skewness, an average data skewness, a ratio of a total data size of a particular stage and a number of tasks in the particular stage, and an average execution time of the particular stage corresponding to previous executions of stages by the cluster, and the task-level runtime characteristics comprise a maximum execution time, a minimum execution time, an average execution time of a particular task, and an average task scheduling delay corresponding to previous executions of tasks by the cluster.

18. The one or more non-transitory computer-readable medium of claim 16, further storing computer-readable instructions that, when executed by at least one of the one or more computing devices, cause at least one of the one or more computing devices to:

receive runtime statistics for the job after the job is executed by the cluster, the runtime statistics comprising job-level, stage-level, and task-level metadata about execution of the job by the cluster; and determine whether a matching feature vector corresponding to the job exists in the database; and if a given one of a stage feature vector, a task feature vector, and a job feature vector corresponding to the job, its stages, and its tasks exists in the database, update the corresponding feature vectors with the runtime statistics, and if one of a stage feature vector, a task feature vector, and a job feature vector corresponding to the job, its stages, and its tasks does not exist in the database, generate new feature vectors corresponding to the job, its stages, and its tasks with the runtime statistics.

19. The one or more non-transitory computer-readable medium of claim 15, wherein the instructions that cause at least one of the one or more computing devices to determine a resource requirement of each stage group in a plurality of stage groups further cause at least one of the one or more computing devices to:

determine whether a matching job feature vector is stored in the database; and if a matching job feature vector is stored in the database, identify a resource requirement of the job defined in the matching job feature vector, and if no matching job feature vector is stored in the database, determine a simulated resource requirement, determine a simulated resource requirement, wherein the instructions that cause at least one of the one or more computing devices to determine a simulated resource requirement further cause at least one of the one or more computing devices to:

identify one or more stage groups of the job, wherein each stage group comprises one or more stages;

retrieve a stage feature vector and a task feature vector corresponding to each stage of each stage group, wherein each stage feature vector and each task feature vector is associated with a corresponding job feature vector stored in the database; and calculate, based at least in part on the retrieved stage feature vectors and task feature vectors, a simulated resource requirement for each stage group.

20. The one or more non-transitory computer-readable medium of claim 15, further storing computer-readable instructions that, when executed by at least one of the one or more computing devices, cause at least one of the one or more computing devices to:

request one or more second new worker containers on the cluster for execution of a third stage group to be executed after the second stage group, wherein requesting the one or more second new worker containers causes the cluster to create a one or more second warmup containers; and schedule, based at least in part on completion of execution of the second stage group, the third stage group on the one or more second warmup containers, wherein scheduling the third stage group on the one or more second warmup containers converts the one or more second warmup containers to one or more worker containers.

* * * * *